US009501753B2

(12) United States Patent
Cantor et al.

(10) Patent No.: US 9,501,753 B2
(45) Date of Patent: Nov. 22, 2016

(54) EXPLORING THE IMPACT OF CHANGING PROJECT PARAMETERS ON THE LIKELY DELIVERY DATE OF A PROJECT

(71) Applicant: International Business Machines Corporation, Armonk, NY (US)

(72) Inventors: Murray R. Cantor, Westwood, MA (US); Evelyn Duesterwald, Pleasantville, NY (US); Tamir Klinger, Brooklyn, NY (US); Peter K. Malkin, Yorktown Heights, NY (US); Paul M. Matchen, Bethel, CT (US); Stanley M. Sutton, Briarcliff Manor, NY (US); Peri L. Tarr, Briarcliff Manor, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 14/179,140

(22) Filed: Feb. 12, 2014

(65) Prior Publication Data
US 2014/0222485 A1 Aug. 7, 2014

Related U.S. Application Data

(63) Continuation of application No. 13/906,490, filed on May 31, 2013, now Pat. No. 9,251,484.

(60) Provisional application No. 61/654,201, filed on Jun. 1, 2012.

(51) Int. Cl.
*G06Q 10/06* (2012.01)

(52) U.S. Cl.
CPC ....... *G06Q 10/063114* (2013.01); *G06Q 10/06* (2013.01); *G06Q 10/0633* (2013.01); *G06Q 10/0635* (2013.01); *G06Q 10/06312* (2013.01); *G06Q 10/06313* (2013.01)

(58) Field of Classification Search
CPC ............... G06Q 10/063114; G06Q 10/06; G06Q 10/06312; G06Q 10/06313; G06Q 10/0633; G06Q 10/0635; G06N 99/005; G06N 5/025; G06N 7/005; G06K 9/6256; G06K 9/6269
USPC .............................. 706/12; 705/7–9; 717/101
See application file for complete search history.

(56) References Cited

U.S. PATENT DOCUMENTS 6,381,580 B1  4/2002  Levinson
6,415,259 B1  7/2002  Wolfinger et al.
(Continued)

FOREIGN PATENT DOCUMENTS

JP      2011003097 A      1/2011
WO     2006/119437 A2    11/2006

OTHER PUBLICATIONS

Kanungo K., "Method and System for Managing Project Work Using Bayesian Inference", WO 2006/119437 A2, Nov. 9, 2006. (previously supplied).*

(Continued)

*Primary Examiner* — Stanley K Hill
*Assistant Examiner* — Dave Misir
(74) *Attorney, Agent, or Firm* — Scully, Scott, Murphy & Presser, P.C.; Louis J. Percello, Esq.

(57) ABSTRACT

A user may be allowed to specify a change in one or more parameter data associated with the project, the one or more parameter data used previously to compute a probability distribution of completion time of the project. The probability distribution of completion time of the project may be recomputed based on the change. The recomputed probability distribution of the completion time of the project may be presented. An option to save the recomputed probability distribution may be provided. An option may be provided to specify another change in one or more parameter data associated with the project and repeat the recomputing and the presenting procedures based on another change in one or more parameter data associated with the project.

20 Claims, 15 Drawing Sheets

(56) References Cited

U.S. PATENT DOCUMENTS

| | | | |
|---|---|---|---|
| 6,519,763 B1* | 2/2003 | Kaufer | G06Q 10/109 706/21 |
| 6,816,819 B1 | 11/2004 | Loveland | |
| 6,966,061 B1 | 11/2005 | Vance et al. | |
| 7,062,449 B1 | 6/2006 | Clark | |
| 7,324,954 B2 | 1/2008 | Calderaro et al. | |
| 7,366,680 B1* | 4/2008 | Creel | G06Q 10/06 705/7.17 |
| 7,398,510 B2 | 7/2008 | Lake | |
| 7,499,897 B2* | 3/2009 | Pinto | G06Q 30/02 706/11 |
| 7,908,167 B1 | 3/2011 | Crum et al. | |
| 8,155,996 B1 | 4/2012 | Cassone et al. | |
| 8,156,050 B2 | 4/2012 | Correll et al. | |
| 8,249,906 B2 | 8/2012 | Ponce de Leon | |
| 8,280,756 B1 | 10/2012 | Kanemoto et al. | |
| 8,332,808 B2 | 12/2012 | Kierans et al. | |
| 8,418,147 B1 | 4/2013 | Odenwelder et al. | |
| 8,626,698 B1* | 1/2014 | Nikolaev | G06Q 10/06393 705/7.17 |
| 8,875,088 B1* | 10/2014 | Holler | G06Q 10/10 717/101 |
| 2002/0082889 A1 | 6/2002 | Oliver | |
| 2002/0143601 A1 | 10/2002 | Sinex | |
| 2003/0229618 A1 | 12/2003 | Judy | |
| 2004/0111306 A1 | 6/2004 | Yokota et al. | |
| 2004/0148209 A1* | 7/2004 | Church | G06Q 10/10 705/7.28 |
| 2005/0021384 A1 | 1/2005 | Pantaleo et al. | |
| 2005/0114829 A1 | 5/2005 | Robin et al. | |
| 2005/0234758 A1 | 10/2005 | Nishi | |
| 2006/0044307 A1 | 3/2006 | Song | |
| 2007/0168918 A1 | 7/2007 | Metherall et al. | |
| 2007/0260505 A1 | 11/2007 | Richardson et al. | |
| 2008/0015871 A1* | 1/2008 | Eder | G06Q 10/067 706/21 |
| 2008/0082388 A1* | 4/2008 | Fishman | G06Q 10/06 705/7.12 |
| 2008/0141214 A1 | 6/2008 | Olson | |
| 2008/0154821 A1* | 6/2008 | Poulin | G06Q 10/04 706/21 |
| 2008/0221946 A1 | 9/2008 | Balon | |
| 2008/0243575 A1 | 10/2008 | Weinberger | |
| 2008/0255910 A1* | 10/2008 | Bagchi | G06Q 10/06 705/7.28 |
| 2008/0256390 A1 | 10/2008 | Chaar et al. | |
| 2008/0313110 A1* | 12/2008 | Kreamer | G06Q 10/06 706/12 |
| 2009/0055228 A1 | 2/2009 | Henry et al. | |
| 2009/0055237 A1* | 2/2009 | Henry | G06Q 10/06 705/7.16 |
| 2010/0021870 A1 | 1/2010 | Patten et al. | |
| 2010/0275263 A1 | 10/2010 | Bennett et al. | |
| 2010/0305987 A1* | 12/2010 | Correll | G06Q 10/06 705/7.28 |
| 2011/0066893 A1 | 3/2011 | Bassin et al. | |
| 2011/0302090 A1* | 12/2011 | Newpol | G06Q 10/06 705/301 |
| 2012/0215574 A1* | 8/2012 | Driessnack | G06Q 10/0639 705/7.12 |
| 2012/0221505 A1 | 8/2012 | Evans et al. | |
| 2012/0323827 A1* | 12/2012 | Lakshmanan | G06F 17/18 706/12 |
| 2013/0159242 A1* | 6/2013 | Rahmouni | G06N 5/048 706/52 |

OTHER PUBLICATIONS

Tronto I. et al., "An investigation of artificial neural networks based prediction systems in software project management", The Journal of Systems and Software, 81,2008, pp. 356-367. (previously supplied).*

Curtis B. et al., "The Case for Quantitative Process Management", IEEE Software, 2008, pp. 24-29. (previously supplied).*

Kenta U. et al., "Work Completion Date Prediction System", JP 2011003097 A, Published Jan. 6, 2011.*

Cantor M., "Calculating and Improving ROI in Software and System Programs", Communications of the ACM, Sep. 2011, vol. 54, No. 9, pp. 121-130.*

Tronto I. et al., "An investigation of artificial neural networks based prediction systems in software project management" The Journal of Systems and Software (Mar. 2008) pp. 356-367, vol. 81.

Curtis B. et al., "The Case for Quantitative Process Management" IEEE Software (Apr. 2008) pp. 24-29.

Office Action dated Jun. 8, 2015 received in co-pending U.S. Appl. No. 13/906,490.

FogBugz, FogBugz Features: Manage Software Projects, Copyright 2000-2013, Fog Creek Software, 55 Broadway, 25th Floor, New York City, NY 10006, pp. 1-6, http://www.fogcreek.com/fogbugz/features/project-management.html.

Hemachandra et al., "Probabilistic Earned Value Forecasting and Activity Performance Index Using Monte Carlo Simulation", Annual Conference of the Canadian for Civil Engineering 2008 "Partnership for Innovation", (Proceedings, vol. 1), Quebec City, QC, Canada, Jun. 10-13, 2008, pp. 220-230.

Disclosed Anonymously, Method for an uncertainty principle of software release determinism, Mar. 19, 2003, ip.com—No. IBM000011850D.

Office Action dated Mar. 16, 2016 received in U.S. Appl. No. 14/178,995, pp. 1-35.

Office Action dated May 10, 2016 received in U.S. Appl. No. 14/184,285, 40 pages.

Notice of Allowance dated Apr. 25, 2016 received in U.S. Appl. No. 14/184,187, 32 pages.

* cited by examiner

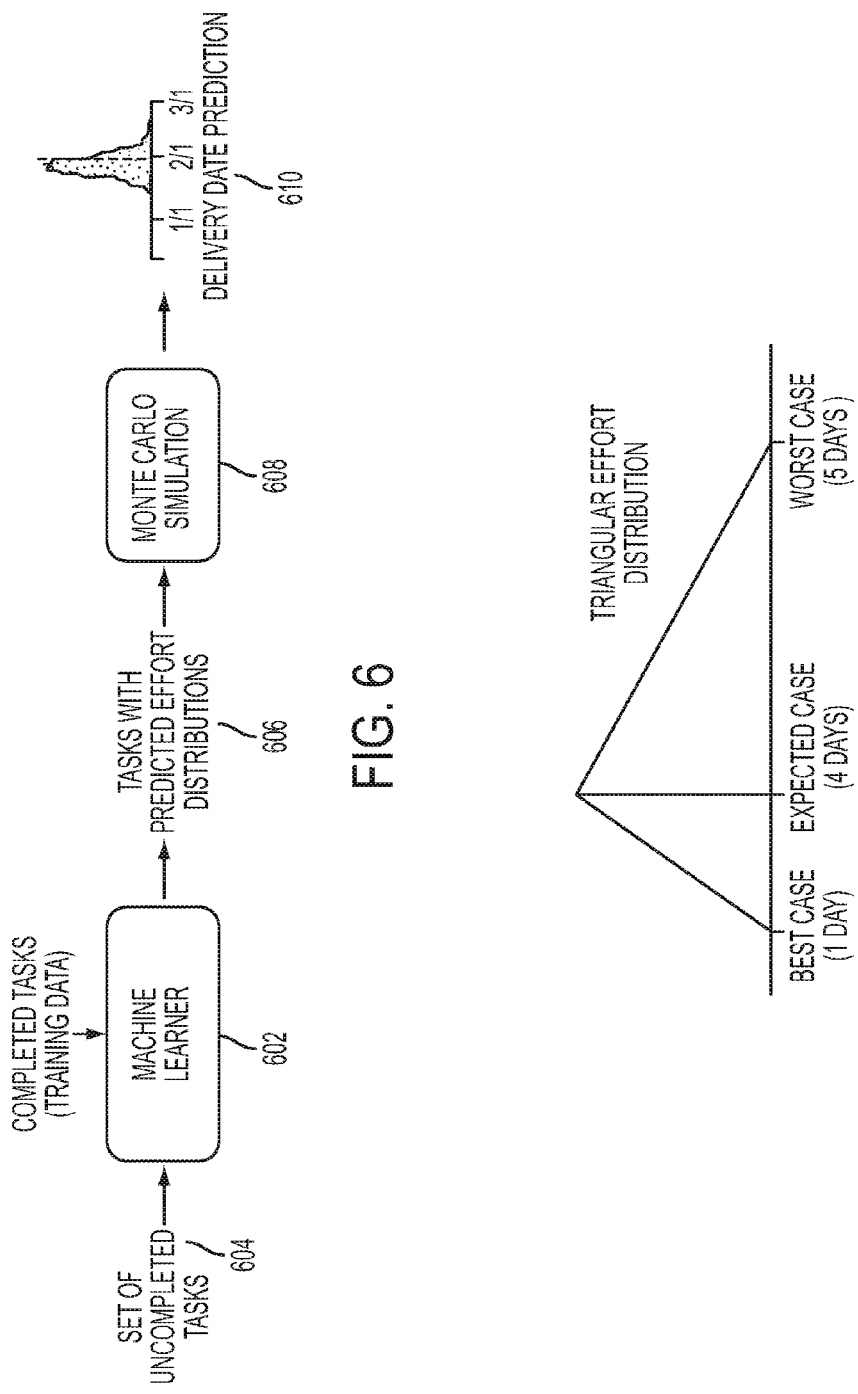

EXPLORING THE IMPACT OF CHANGING PROJECT PARAMETERS ON THE LIKELY DELIVERY DATE OF A PROJECT

CROSS-REFERENCE TO RELATED APPLICATIONS

This application is a continuation of U.S. patent application Ser. No. 13/906,490, filed May 31, 2013, the entire content and disclosure of which is incorporated herein by reference. U.S. patent application Ser. No. 13/906,490 claims the benefit of U.S. Provisional Application No. 61/654,201, filed on Jun. 1, 2012, which is incorporated by reference herein in its entirety.

FIELD

The present application relates generally to computers, and computer applications, and more particularly to computer implemented predicting of likelihood of on-time product delivery, diagnosing of issues that threaten delivery, and exploration of likely outcome of different solutions.

BACKGROUND

Project estimation is an ongoing need in all kinds of development and engineering projects. In many disciplines project estimation techniques are well established and widely successful. The success of these estimation techniques depends on general similarities between projects, such as in the nature and number of tasks to be performed, the standardization of materials and work products, the ability to anticipate resource quantities and costs, reliable expectations about the rate at which work will be performed, and so on.

Standard project estimation methods breakdown when applied to projects that differ from the norm or that vary in ways that are inconsistent with the assumptions of the methods. For such projects, up-front estimation of project characteristics such as total effort required or time to completion are likely to be inaccurate and unrealistic.

Software development is an example field in which a relatively large proportion of projects are not well estimated by traditional approaches. One reason is that once a software product has been developed it can easily be replicated, so there is seldom any need to build the same software product twice. For software development, then, the question is not whether a project will be new but rather how new it will be. Additionally, the nature of software development changes over time, as new programming languages, development methods, programming environments, execution platforms, and application domains arise. Software development thus directly feeds its own evolution. Additionally, the experience, skill level, and productivity of programmers practicing in the field vary widely, and the development methods and practices followed by organizations are often specialized and may be proprietary. A further complication is that the requirements on a software project may change during the project, the resources available to the project may likewise change during the project, and the project may be subject to uncontrolled dependencies on other projects or systems of uncertain characteristics and availability. All of these complications and others undermine the applicability and effectiveness of traditional process estimation techniques to software development, like projects or other projects that have similar characteristics.

BRIEF SUMMARY

A method of exploring an impact of changing project parameters on a likely delivery date of a project, in one aspect, may comprise allowing a user to specify a change in one or more parameter data associated with the project, the one or more parameter data used previously to compute a probability distribution of completion time of the project. The method may also comprise recomputing the probability distribution of completion time of the project based on the change. The method may further comprise presenting the recomputed probability distribution of the completion time of the project. The method may also comprise providing an option to the user to save the recomputed probability distribution of the completion time of the project. In response to detecting that the user chose not to save the recomputed probability distribution of the completion time of the project, the method may further comprise recovering the probability distribution of completion time of the project that was computed previously and the one or more parameter data before the change. Responsive to detecting the user chose to save the recomputed probability distribution of the completion time of the project, the method may comprise storing the recomputed probability distribution of completion time of the project and the change in one or more parameter data. The method may also comprise providing an option to the user to specify another change in one or more parameter data associated with the project and repeat the recomputing and the presenting based on another change in one or more parameter data associated with the project.

A system of exploring an impact of changing project parameters on a likely delivery date of a project, in one aspect, may comprise a graphical user interface module operable to execute on a processor and further operable to allow a user to specify a change in one or more parameter data associated with the project, the one or more parameter data used previously to compute a probability distribution of completion time of the project. A prediction module may be operable to recompute the probability distribution of completion time of the project based on the change in said one or more parameter data. The graphical user interface module may be further operable to present the recomputed probability distribution of the completion time of the project. The graphical user interface module may be further operable to provide an option to the user to save the recomputed probability distribution of the completion time of the project, wherein responsive to detecting that the user chose not to save the recomputed probability distribution of the completion time of the project, the probability distribution of completion time of the project that was computed previously and one or more parameter data before the change are recovered, and responsive to detecting that the user chose to save the recomputed probability distribution of the completion time of the project, the recomputed probability distribution of completion time of the project and the change in one or more parameter data are stored. The graphical user interface module may be further operable to provide an option to the user to specify another change in one or more parameter data associated with the project and repeat recomputing of the probability distribution of completion time of the project based on another change.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 6 illustrates a flow of an overall algorithm that combines a machine learning based task effort prediction with a Monte Carlo simulation to predict completion time distribution in one embodiment of the present disclosure.

FIG. 7 illustrates an example of a triangular distribution of an effort associated with a task.

DETAILED DESCRIPTION

An answer to the difficulty of estimating software projects is the approach of empirical process control. Traditional methods of process control for software development make use of defined processes in which development activities are specified in advance and the project is expected to follow a planned course. Empirical process control, in contrast, relies on the frequent empirical assessment (and reassessment) of project status and operating conditions. It is intended to enable a project to adapt dynamically to changes in status and operating conditions, thereby allowing outdated plans and expectations to be replaced by new ones that are more attuned to changed circumstances.

In one embodiment of the present disclosure, a methodology may be presented that proposes an empirical approach to project estimation that is compatible with empirical process control. The methodology of the present disclosure may be applied to empirically controlled projects in which assumptions about the project are expected to change during the course of the project. In one embodiment of the present disclosure, the methodology addresses the dynamic nature of projects that are managed empirically in the following ways:

It makes no assumptions about which characteristics of projects are most important for project estimation but determines the significant characteristics for each project individually;

It makes no assumptions about how specific project characteristics contribute to estimated values but evaluates alternative formulas to determine the most appropriate relationships;

It can identify different subsets of project tasks to which different estimation formulas may apply and determine the best basis for independently estimating each;

It can change the basis of estimation for a project dynamically throughout the course of the project, in response to changes in the characteristics and conditions of the project.

Additionally, the methodology is not constrained to work with a particular set of project attributes but is able to work with a wide variety of project attributes that may be available.

By means of the characteristics listed above, for example, the methodology is able to provide estimates for projects in cases where traditional approaches to project estimation break down. It is further able to provide estimates for projects where traditional approaches may still apply.

Figure 1:
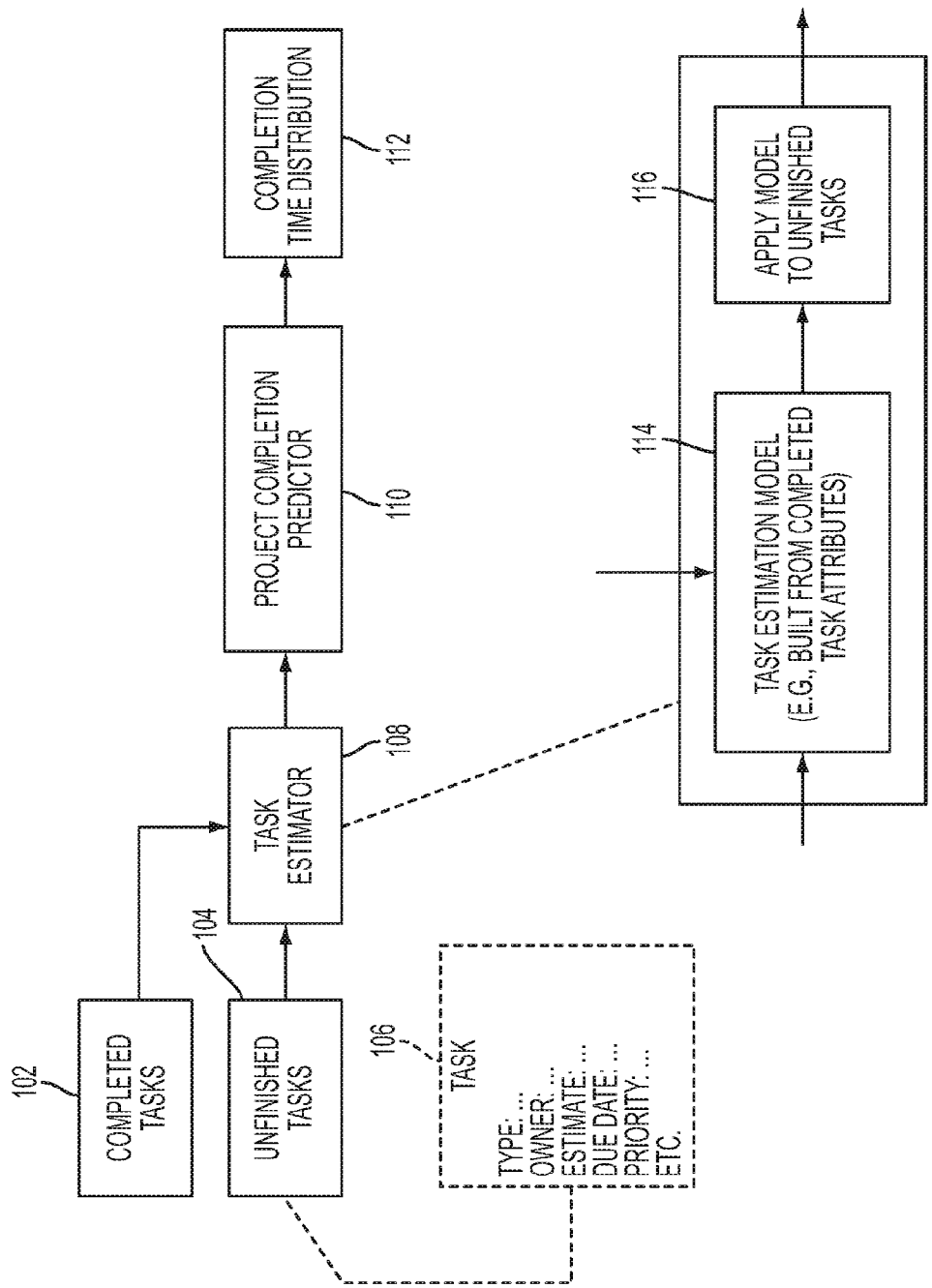
FIG. 1 is a diagram illustrating project estimation prediction in one embodiment of the present disclosure.

FIG. 1 is a diagram illustrating a project estimation predictor in one embodiment of the present disclosure. In one embodiment, a probability distribution of completion times for a project may be predicted based on estimating a probability distribution of effort for the tasks in the project. Here "effort" refers to the total work time required for completing a task. Effort is usually measured in man-hours and is different from duration, which may include time during which nobody is working on the task. Referring to FIG. 1, an input for project estimation prediction may include a representation of a set of completed tasks 102, if any, belonging to the project to be estimated and a set of attributes associated to those tasks. Another input may include a set of as-yet incomplete tasks (also referred to as unfinished tasks) 104 belonging to the project to be estimated and a set of attributes associated to those tasks. An unfinished task 104, for example, may have attributes (shown at 106) such as the type, the owner, an initial estimate for completion, a due date, a priority status, and other such characteristics.

Optionally, additional input may include a representation of a set of completed tasks, which belong to a different but similar project to the one being estimated. Such tasks may also have an associated set of attributes.

A task estimator 108 may consider the completed tasks 102, if any, for the project to be estimated and the values of their attributes. The task estimator 108 may also consider the completed tasks, if any, not belonging to the project (belonging to a different similar project) to be estimated and the values of their attributes. Based on those considerations, the task estimator 108 determines a probability distribution of the estimated effort (or times) for each of the as-yet incomplete tasks belonging to the project.

A project completion predictor 110 may take as input, information on resource and scheduling constraints applicable to the project to be estimated. Based on the estimated probability distribution times for each of the as-yet incomplete tasks, e.g., determined by the task estimator 108, and also based on the information on resource and scheduling constraints applicable for the project to be estimated, the project completion predictor 110 determines an estimated probability distribution of the completion time of the collection of as-yet incomplete tasks as a whole.

The task estimator 108 determining a probability distribution of the estimated effort (e.g., person-hours) for each of the as-yet incomplete tasks belonging to the project, and the project completion predictor 110 determining an estimated probability distribution of the completion time for the project may be repeated one or more times during the course of the execution of a project to produce successive estimates of the probability distribution for the completion time of the project that may be progressively better informed and more accurate.

The above methodology provides a logical chain from the effort of individual tasks to the completion time of the project. In one embodiment of the present disclosure, both tasks from the project to be estimated and tasks from other projects may be considered. In one embodiment of the present disclosure, attributes of tasks play a role in determining the estimates. The resulting estimates of task effort and project time are provided in the form of probability distributions.

The task estimator 108 in one embodiment may comprise a task estimator model 114. The task estimator model may have been built using the attributes of the input completed tasks. The task estimator 108 may apply the input unfinished tasks to the task estimator model as shown at 116.

In one embodiment of the methodology of the present disclosure, the task estimator 108 may also take as input the author, date and time of any work performed on the task. The task estimator 108 in considering the one or more completed tasks, if any, for the project to be estimated, may specifically consider the date and time of work performed on the completed tasks. The task estimator 108 in considering the one or more completed tasks, if any, not belonging to the project to be estimated, may specifically consider the date and time of work performed on that completed task. In addition to the date and time of worked performed, the effort estimator 108 may also take into consideration the "state" of the task at different points in time. Tasks may have a special "state" attribute which indicates the status, condition, progress, or disposition of the task. For example, a newly created task might have a state of "New". After a task has been assigned to a developer to be worked on it may be (manually) moved into a state of "Triaged". When that developer begins work he could indicate this by moving the task into a state called "In Progress". Finally, when the task is completed he could move it to a "Closed" state to indicate that is complete. The dates at which these state transitions occur are another clue as to when the task was worked on and therefore how much effort was taken to complete it. The task estimator 108 may, on the basis of those considerations, determine an estimate of the effort spent on any of the completed tasks.

The task estimator 108 in one embodiment may use a learning algorithm over attributes of the input completed tasks to discover which task attributes, of those available, are significant in the estimation of task effort. The task estimator 108 may also use a learning algorithm over the attributes of the input completed tasks to discover the significant relationships of available task attributes to task effort. In one embodiment of the present disclosure, a task estimation model 114 may comprise the output of such a learning algorithm. Using the learned information, the task estimator 108 may determine and output a probability distribution of effort for the input as-yet incomplete tasks. Optionally, a categorization of tasks based on the similarity of the effort or time required to complete them may be produced as output. Optionally, a set of attributes for each category of task that is most predictive of effort required to complete a task in that category in the project to be estimated may be produced as output.

The task estimator 108 functionality may be repeated one or more times during the course of the execution of a project, each repetition of the process may take different input data, and each repetition of the process may produce different results, including possibly different task estimation models, different estimates of the distribution of effort for each task, different categorizations of tasks, and different sets of attributes associated with categories of task.

The learning algorithm of the present disclosure in this embodiment may discover (learn) significant attributes and relationships. The learning algorithm provides a different methodology from methods that rely on a fixed set of attributes and with respect to methods that rely on fixed relationships of attributes to effort. The methodology of the present disclosure need not have dependence on any specific attributes.

The learning algorithm operates on the input completed tasks and their attributes, for example, as follows. The learning algorithm may comprise selecting one or more subsets of the tasks. For each subset of tasks, the learning algorithm may select a subset of the attributes of the included tasks. For each subset of tasks, and for each associated subset of attributes of those tasks, the learning algorithm may use the attribute values to make an estimate of the effort of the tasks which have those attribute values. The above steps may be repeated for various subsets of tasks and various subsets of attributes of those tasks.

The learning algorithm may also comprise evaluating the accuracy of the various estimates of task effort produced for alternative subsets of tasks and alternative subsets of attributes. Based on the evaluation, the learning algorithm may determine the particular subsets of tasks and attributes that lead to the best overall prediction of the effort. An output produced from the learning algorithm may comprise one or more subsets of tasks for the project. For each subset of tasks a specific means, such as a formula, equation, or method for estimation the effort of the tasks belonging to that subset may be produced.

For instance, the learning algorithm may take the total population of input tasks (total set of tasks being estimated such as the total set of tasks from a project) and break it down into various subsets. A "subset of tasks" is a portion of the total population of tasks. For each subset of tasks, a different subset of attributes (i.e., a different combination or selection of attributes) may be considered. Each way of breaking down the total population of tasks into subsets and selecting attributes for those subsets gives rise to a possibly distinct estimate for the total population of tasks as a whole. The learning algorithm may perform this process (of breaking down the population into subsets and selecting different combinations of attributes) multiple times, giving it multiple overall estimation results. The learning algorithm may compare the multiple overall estimation results it obtains and choose the approach that gives the best result. The outputs of the algorithm may be based on this choice.

More particularly, the learning algorithm may operate as follows in one embodiment. It selects completed tasks from among the set of all completed tasks for the project to date. This set of tasks is called the "training set". These tasks may have their effort value already recorded or may require the effort to be estimated. The learning algorithm provides effort estimates for those tasks that require it. Once all tasks have associated effort values—either manually provided or automatically estimated—the learning algorithm builds an estimation model using the tasks. Specifically, for example, it uses a subset of the attributes of those tasks to partition the tasks into disjoint groups, each of which disjoint groups contains tasks that have similar effort values. The partitioning is performed by repeatedly choosing attributes and attribute values for those attributes that divide the tasks. For example, if the attribute of "priority" is chosen then the algorithm might partition the tasks into three groups: those with "high" priority; those with "medium" priority; and those with "low" priority. Such a partitioning would be chosen if the variance in effort values for each group was smaller than that of the whole set of tasks. This partitioning process can be repeated with other attributes and their values until no further partitioning is productive in reducing the variance. The choices made to partition the tasks are recorded and become part of the estimation model. To use the model to estimate the effort on a new task, the choices are applied to that task to find its group. The average effort from that group is used as the task estimate.

In one embodiment of the present disclosure, the task attributes provided as input and used for learning may include, but not limited to, one or more of the following:

Corrected estimate: A revision of a previously estimated effort or time required to complete a task;
Creation date: The date on which the task was created;
Created by: The person who created the task;
Due date: The date on which a task is due;
Estimate: User supplied original or subsequently revised estimated effort or time required to complete a task;
Links: The links or relationships that a task may have to other tasks, to the work products or records of other tasks, and to other information;
Number of comments: The number of comments that have been recorded in relation to a task;
Number of teams: The number of project teams that are associated with a task;
Owner name: The name of a person who is assigned to perform or oversee a task;
Planned-for date: The ending date of any part of the project schedule in which a task is to be completed;
Planned-for iteration: The name of any part of the project schedule in which the task is to be completed;
Planned-for start date: The starting date of any part of the project schedule in which a task is to be completed;
Priority: The priority of a task with respect to other tasks in the project;
Project name: The name of the project to which a task belongs;
Resolution: A representation of the way in which a task has been completed, if completed;
Resolution date: The date on which a resolution was achieved for the task;
Severity: The severity of any problem that may be represented by a task;
State: A representation of the task relative to the work being done on it and its prospective or actual completion;
State modification date: A date, associated with a particular set of attribute values, that represents the time at which those attribute values were set or the time at which they were changed;
Story points: A user supplied estimate of the complexity of a task or amount of effort of time required to complete a task;
Summary: A summary description of a task;
Team name: The name of the team to which actual or prospective performers of the task nominally belong;
Time spent: The amount of effort or time actually spent on the task;
Type: The type of the task as denominated with respect to a particular system of task types;
Work item identifier: A unique identifier for the task.

The task estimator 108 of the present disclosure may consider other kinds of information in addition to task attributes. Such other information may be received as input. For instance, the information input to the methodology of the present disclosure and considered in the learning may include information derived or computed from one or more task attributes. The information input to the method and considered in learning may also include information about the history of the task, including the history of changes to the values of task attributes, further including the absolute and relative sequence, timing, frequency, and other measures, properties, and/or patterns of the history of changes to these attribute values. The information about the history of changes to the values of task attributes may include information such as the number of times that a task has been rescheduled, the number of times that a task has been considered completed and then considered not completed, the number of times that the owner of a task has changed, and/or the number of times that any other specific attribute or relationship has changed, among others.

As described above in detail, given the work required in a development project, specified as a set of tasks, a methodology in one embodiment of the present disclosure predicts when the project is likely to deliver. The methodology in one embodiment reasons about an uncertain future entity: the delivery date. The project delivery date is uncertain because it depends on a number of events whose occurrence cannot be known for sure, such as the completion of subtasks, the successful integration of components, etc. One can only take imprecise or incomplete measurements of such events. Thus, instead of modeling a single future delivery date, the methodology of the present disclosure in one embodiment treats the delivery date as a range of dates, together with a probability function that provides the likelihood of delivering on each day in the range. Modeling the delivery date in this fashion, as a probability distribution, enables the reasoning about the likelihood of delivery by a certain date.

Figure 2:
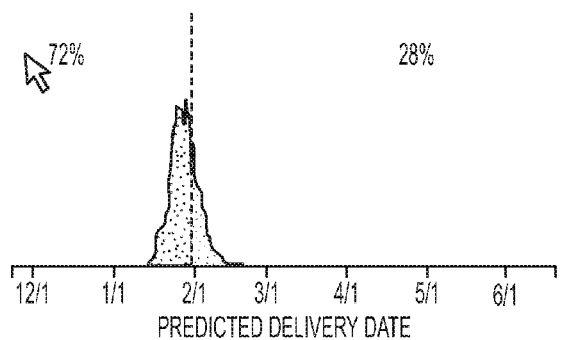
FIG. 2 shows an example probability distribution over a range of dates predicted according to the project estimation prediction of the present disclosure.

Consider an example shown in FIG. 2. FIG. 2 shows an example probability distribution over a range of dates (approximately January 15 through February 20). At any date, the area under the probability distribution up to that date indicates the likelihood of delivering by that date. For example, the curve shows 72% likelihood that the project will deliver by February 1st, its planned delivery date, since the area under the curve up to February 1 is 72% of the total area. Conversely, there is a 28% chance that the project will be late.

Monte Carlo Simulation

The methodology in one embodiment of the present disclosure may utilize a work schedule simulation for predicting project completion (e.g., at 110 in FIG. 1). This simulation takes as input a specification of the work as a set of tasks. There are numerous process-dependent variations on exactly what defines a "task". In the present disclosure, a task refers to the smallest unit of work that a team explicitly breaks out and assigns to a developer. Tasks may have dependencies on other tasks, and they may have a number of task attributes, such as an owner, a priority/severity value, a due date, a type, and an effort estimate.

Many possible schedules can be generated for a given set of tasks, where a schedule is simply an ordered assignment of tasks to each available developer. The work schedule simulation proceeds by searching through the possible schedules. Each explored schedule obeys the constraints set by the task attributes, such as the dependencies, owner and due dates. The simulation randomly explores the space of possible schedules.

In order to explore a schedule, the simulation scheduler needs to know how long it will take to complete the task, that is, the task completion effort. Just as with overall project delivery date prediction, task completion effort is an uncertain entity. Hence, the models in the present disclosure in one embodiment take effort as a range of values together with a probability distribution, which in the present disclosure is referred to as effort distribution. For example, the methodology of the present disclosure may estimate a given task as taking between 3 and 7 days, and it may be much more likely to take 6 days than 3 days. The width of an effort distribution expresses the degree of uncertainty in the estimate.

For example, for small highly predictable tasks, uncertainty should be low and the effort distribution will be narrow, covering a small range of possible completion times. Conversely, a large, complex task with a number of dependencies may have significant uncertainty. The corresponding effort distribution should be wide pointing to a large number of possible completion times.

Figure 3:
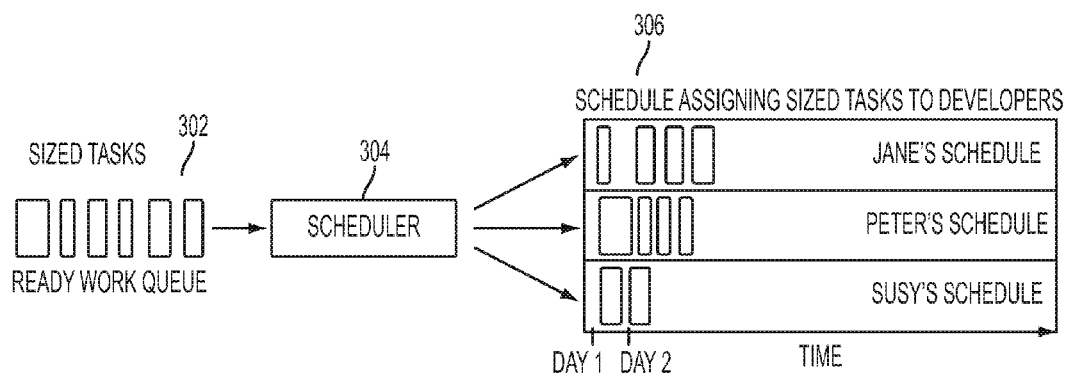
FIG. 3 illustrates determining of a schedule for a plurality of tasks in one embodiment of the present disclosure.

The input to the work schedule simulation may be refined as a set of tasks along with effort distributions for each task. Building a schedule out of tasks whose duration is specified by a distribution may be accomplished through the use of Monte Carlo (MC) simulation. MC simulation randomly explores a set of schedules in n simulation steps (say n=10,000). During each simulation step, one schedule is built out of the available tasks. First, the available tasks are sized by randomly selecting a completion effort according to the task's effort distribution. The sized tasks can then be assigned, for example, using any existing job scheduling algorithm. For example, a simple list scheduling algorithm that maintains a ready queue of tasks (i.e., task that either have no dependents or whose dependents have already been assigned) may be used. If a ready task has an owner specified, it will be assigned to that owner. Otherwise, it will be assigned to a randomly chosen developer. After a task has been assigned, other tasks it depends on can be marked ready (unless they have other dependencies). The result of the simulation step is one schedule with one possible delivery date as shown in FIG. 3. For instance, a scheduler 304 receives as input a set of tasks 302 and produces a schedule of assignments and delivery date 306.

Figure 4:
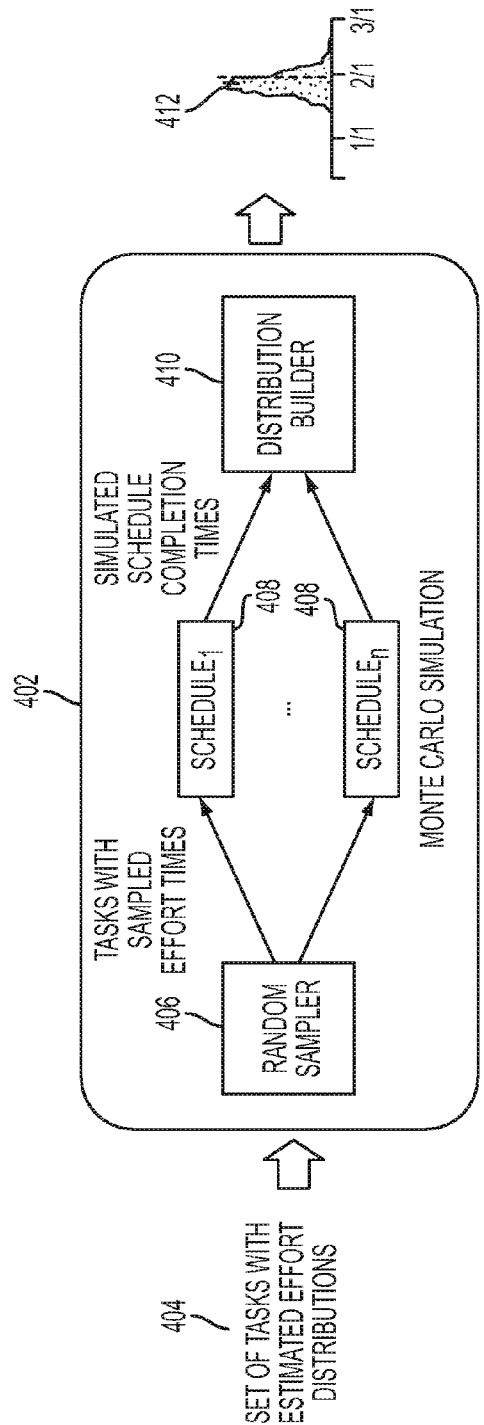
FIG. 4 illustrates computing of a distribution of predicted project completion times in one embodiment of the present disclosure.

After n simulation steps, the MC simulation has built n schedules leading to n possible delivery times. Plotting these n delivery dates over time produces a delivery date distribution, as illustrated in FIG. 4. For example, a random sampler 406 of a simulator 402 receives a set of tasks with estimated effort distribution 404 as input, simulates n schedule completion times 408. A distribution builder 410 builds completion time distribution 412.

In one embodiment of the present disclosure, the simulation need not try to identify optimal schedules, and it need not exhaustively explore the space of possible schedules. However, for a sufficiently large number of simulation steps (typically in the 10,000s) the simulation will have explored the most likely schedules leading to a determination of the likely range of delivery dates.

The accuracy and precision of the simulation outcome rests on the accuracy and precision of the input, that is, on accurate distributions of the level of effort. Thus, a challenge may be in the identification of realistic distributions of the level of effort required for task resolution.

A Machine Learner for Effort Prediction

One way to obtain task effort distributions is to ask the developers to provide them. Developers may have a deep understanding of the complexities and risks involved in completing a task and thus may prove to be a good source of realistic effort distributions. However, in practice, developers often might not provide accurate estimates for various reasons. In the absence of any other source of information, however, for example at the beginning of a new development project, developer estimates might still be the most reliable source of effort distributions.

As the project proceeds and progresses, the methodology of the present disclosure in one embodiment gains information about tasks and can begin to overcome the problems with user estimates using machine learning techniques. Machine learning can be deployed to predict task effort from the evidence that is obtained from already-completed similar tasks. An aspect of learning is determining what similar tasks are. The machine learner uses a training set of examples of completed tasks with their attributes including their actual completion times to build a prediction model. The prediction model discriminates the completed training tasks using a variety of task attributes (such as owner, type, or priority). Once the model is available, the machine learner can apply it to a new task to obtain a task effort prediction by matching the new task to the most similar training tasks.

For example, assume a scenario where tasks are either enhancements or defects. Consider a training set having 10 completed tasks: 5 enhancement tasks that each took 2 days and 5 defect tasks that each took 1 day. From this training set of already-completed tasks, the machine learner might build a model that contextualizes its prediction depending on the type of task it is given. In this case, the model may simply encode that enhancements usually take 2 days and defects 1 day. This model can now be applied to new tasks: if the new task is an enhancement, the model predicts 2 days, if it is a defect the prediction is 1 day. Clearly, this is an over-simplification: a real training set will not be as simple and bipolar, where different types of tasks always take exactly the same amount of time. To handle a more diverse (and realistic) training set, the machine learner may need to use a variety of attributes of the task (such as owner, task type, description, priority) in order to discriminate the elements in the training set to determine which ones are most similar to a new piece of work.

Figure 5:
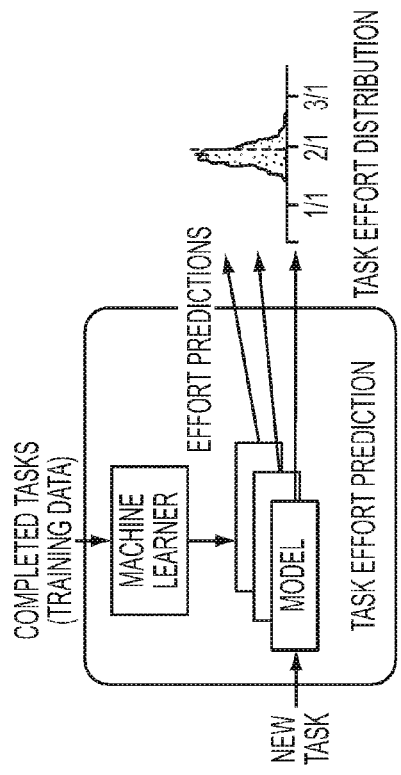
FIG. 5 illustrates estimating or predicting effort associated with a task in one embodiment of the present disclosure, for instance by a machine learning technique.

With many machine learning techniques, there is a tendency to overfit, which means that the technique will treat the training data as more representative of new data than it really is. To compensate for this tendency, the machine learner in one embodiment of the present disclosure builds a series of models on different training sets, as illustrated in FIG. 5. For example, the machine learner may use multiple training sets instead of one training set. Each training set gives rise to a different model. All models may be applied simultaneously to obtain a plurality of discrete (single-valued) estimates. Each model produces an estimate, the plurality of estimates forms the distribution of estimates.

In particular, for example, the machine learner may start with a training set of examples which have their effort values set. From these examples the machine learner may build the predictive model. To avoid overfitting, this process may be repeated as follows in one embodiment of the present disclosure. Another training set may be built whose examples, for instance, are chosen at random from the first. As a simple example for the sake of illustration, if the first training set had three examples labeled 1, 2, and 3, the second training set might include 2, 2, 1. The training sets constructed in this way may include duplicates and may have not included all examples from the original. Once this second training set is constructed another predictive model is built from it. This process of creating derived training sets and building predictive models from the derived training sets is repeated multiple times. For instance, the process may be repeated 50 times. At the end these repetitions, there will be 51 different predictive models—the original model, and 50 derived models. Then, when given a new task to estimate, each model may be applied, wherein each model contributes 1 predicted effort value. The complete set of 51 effort values from the different models is then used to create a distribution (or histogram) of possible effort values for the supplied task. Because each training set is different and emphasizes different examples, the problem of overfitting the model to the one initial training set is avoided. Here, "overfitting" refers to making predictions that work well for the examples in the training set, but not for other examples.

After an initial learning period, during which sufficient training data is gathered and a series of models are built, a methodology of the present disclosure in one embodiment begins to predict, for each as-yet incomplete task, an effort distribution.

Both team velocity (the amount of work a team completes in a given period of time) and the nature of tasks may change over time on a given project. Thus, the machine learning is an ongoing process. Newly completed tasks increase the size of the training sets, and the machine learner continuously builds new models out of the new training sets. As a result, task effort prediction is adaptive and reflects changes and trends that may occur during a project's evolution. In one embodiment, individual person's velocity (the amount of work an individual completes in a given period of time) may be considered similarly to the team velocity.

Combining the machine learning based task effort prediction with Monte Carlo simulation provides the flow of the overall algorithm shown in FIG. 6. A machine learner 602 trains (builds) a model based on the available data, e.g., completed tasks, as a training set. A set of uncompleted tasks 604 is input to the built model. Applying the built model to the set of uncompleted tasks produces tasks with a predicted effort distribution 606. A project completion predictor such as a simulator 608 (e.g., Monte Carlo simulator) uses the predicted task effort distribution 606 for each uncompleted task to produce a completion time (delivery date) distribution 610 for the set of all the uncompleted tasks.

User Estimates

The machine learner, as described so far, does not require explicit user input; it can learn solely from actual development data (the specification of completed tasks and their actual completion effort). However, the machine learner may utilize user estimates. For example, there might be an initial learning delay, during which training sets are collected and machine learning models are built. In order to provide prediction results during these early learning phases, a methodology of the present disclosure in one embodiment may utilize user estimates of task effort, if they are available.

One way for users to estimate task effort and to capture the uncertainty they may have regarding the level of effort is through the use of three values: a best case, an expected case and a worst case estimate. From these three values a triangular distribution of the effort may be derived as shown in FIG. 7.

If user estimates are unreliable, they will quickly be overcome by learned estimates as actual task completion time data becomes available for the machine learner. Conversely, if evidence suggests that user estimates are reliable, they will continue to form the basis of task effort prediction in the machine models.

A methodology of the present disclosure in one embodiment obtains this effect automatically by feeding available user estimates to the machine learner as a task attribute to learn from. If it turns out that the estimates are a good indication of the actual task effort, the models will reflect this relationship and use the estimate as a primary discrimination factor for the prediction. If, on the other hand, the training set for the machine learner contains evidence suggesting that the estimates of a particular user are poor, they will be discarded and not utilized in the prediction models. This ability to adaptively shift between reliance on user estimates and reliance on machine predictions provides a level of robustness that can tolerate unreliable data sources, such as poor user estimates or unreliable development data quality.

As described above, predicting the likelihood of on-time delivery as a probability distribution over possible delivery dates, in one embodiment of the present disclosure may use a combination of machine learning and stochastic simulation techniques. For example, the Machine Learner trains on project history to build a work effort predictor; Monte Carlo Simulation is used to simulate likely project completion schedules. The methodology of the present disclosure for predicting the likelihood of on-time delivery as a probability distribution over possible delivery dates in one embodiment is adaptive, for example, the methodology continuously updates its predictions as new evidence becomes available.

Figure 8:
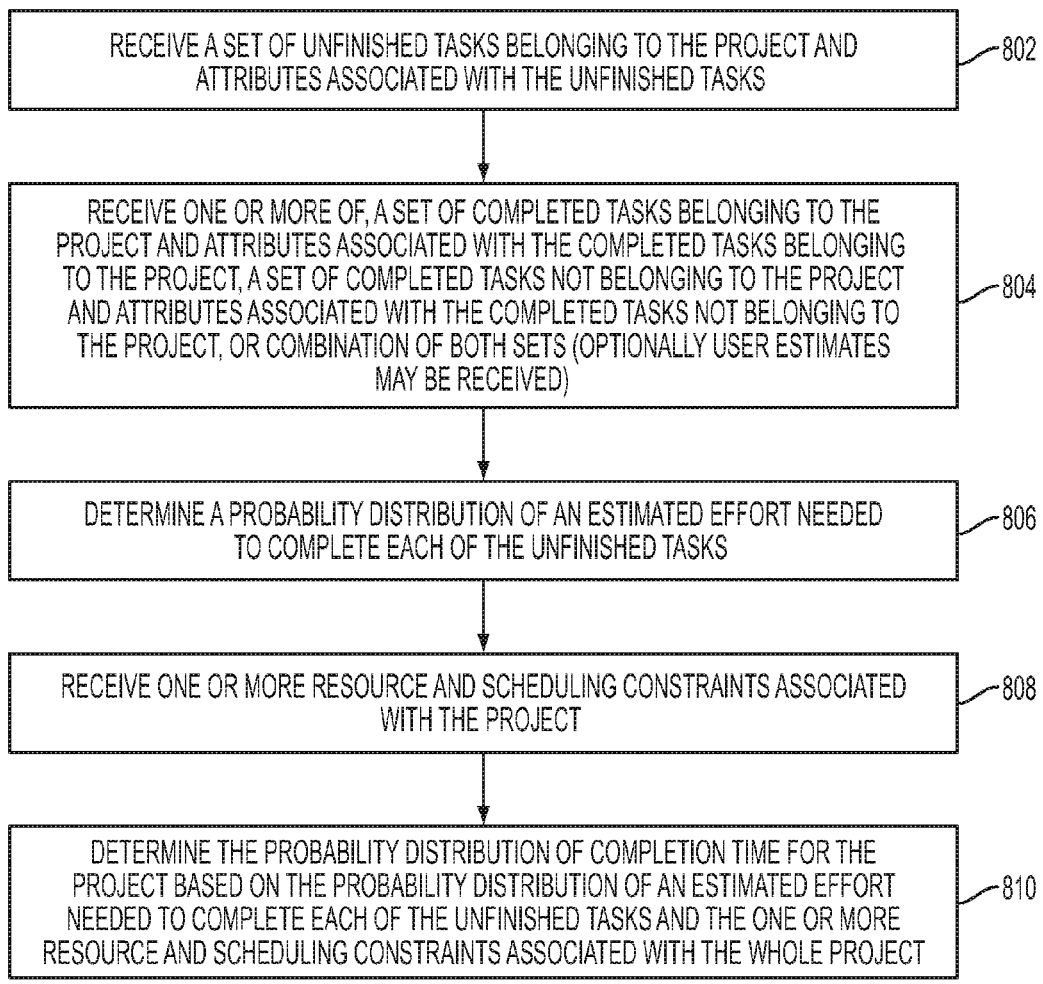
FIG. 8 is a flow diagram illustrating a method of predicting completion time distribution in one embodiment of the present disclosure.

FIG. 8 is an overview flow diagram illustrating a method of predicting completion time distribution in one embodiment of the present disclosure, for example, as described in detail above. At 802, a set of unfinished tasks belonging to the project and attributes associated with the unfinished tasks is received. At 804, the method may also comprise receiving one or more of, a set of completed tasks belonging to the project and attributes associated with the completed tasks belonging to the project, a set of completed tasks not belonging to the project and attributes associated with the completed tasks not belonging to the project, or combination of both sets. For example, the methodology of the present disclosure may receive as input either a set of completed tasks in the project or a set of completed tasks not belonging to the project, or both. For instance, if there are no completed tasks in the project, there would be no such input. Also, optionally, user estimates of effort involved in finishing one or more of the unfinished tasks belonging to the project may be received.

At 806, a probability distribution of an estimated effort needed to complete each of the unfinished tasks is determined. This determination may be done using the input received. For example, the methodology of the present disclosure may perform its prediction or estimation based on either a set of completed tasks in the project or a set of completed tasks not belonging to the project, or both. For instance, the methodology of the present disclosure may determine estimates based only the information associated with the completed tasks belonging to another project, for example, if there are no completed tasks in this project. As another example, an input to the methodology need not include a set of completed tasks not belonging to the project, for instance, if there are completed tasks belonging to the project, whose information may be used for the estimation. As yet another example, if both the set of completed tasks belonging to the project and the set of completed tasks not belonging to the project are available, their information may be used in the estimation. Still yet as another example, the methodology of the present disclosure may determine estimates based on the user estimates of effort (if available), for instance, without the information associated with the set of completed tasks in the project and the set of completed tasks not belonging to the project. Further yet, the methodology of the present disclosure may determine estimates based on one or more, or any combinations of the user estimates of effort, the information associated with the set of completed tasks belonging to the project, or the information associated with the set of completed tasks not belonging to the project.

At 808, one or more resource and scheduling constraints associated with the project are received.

At 810, the probability distribution of completion time for the project is determined based on the probability distribution of an estimated effort needed to complete each of the unfinished tasks and the one or more resource and scheduling constraints associated with the whole project. The project comprises an aggregated collection of tasks in the project, e.g., the set of unfinished tasks belonging to the project and the set of completed tasks belonging to the project, if any.

As described in more detail above, in one embodiment of the present disclosure, the probability distribution of an estimated effort needed to complete each of the unfinished tasks may be determined (e.g., at 806) using machine learning, which learns from available data associated with the completed tasks. The learning may be then applied to the unfinished tasks to estimate how long those unfinished tasks will task.

Also as described above in more detail, in one embodiment of the present disclosure, the probability distribution of completion time for the project may be determined by repeating random sampling of scheduling and assigning of the unfinished tasks to team members (or workers) subject to the resources and scheduling constraints. A Monte Carlo simulation is an example of such technique.

The above-described methodology may predict the probability that a development project will complete on time. Other aspects of the present disclosure may provide for problem diagnosis, what-if-analysis, expert assessment, and a graphical user interface for allowing a user to interact in discovering the probability, diagnosis, what-if-analysis, and expert assessment. For instance, in case it is predicted that a project might not complete on time, aspects of the present disclosure may include providing for alternatives for bringing the project back in track for completion on time, how to do so, which tasks or aspects of the project might need to be sacrificed to do so, and other alternatives. Diagnostic patterns may be analyzed and provided to explain why the procedure is not working properly and other reasons as to why the completion time would not be met, for example, so that a user may take remedial procedures such as changing the governance of an organization, and such that the problem is not repeated again. This analysis may be partially based on information about the estimates and the likelihood of certain tasks taking certain lengths of time as well as experience with how those estimates have gone in the past.

Insight may be provided early, for instance, into the likelihood of producing and delivering a project, e.g., software system, on time. If there are problems, diagnoses of those problems may be performed as soon as possible to determine the next steps that should be taken to get the work back on schedule. A "what-if" analysis of the present disclosure may evaluate different alternative strategies for handling the issue (e.g., current problem), and getting the project back on schedule.

A graphical user interface (GUI) of the present disclosure in one embodiment may provide for a risk trend graph that may show a variance as direct measure of schedule risk. The GUI may also provide for a composite graph showing relationship between different pieces of information with respect to each other and how the relationships between those pieces change over time. The GUI may also include a burndown graphics that indicate bubbling up items that are completed to the top, and a cone of uncertainty with predictions. The GUI may further include a live playback of history (e.g., time slider) with respect to the burndown and one or more other charts.

The aspects of the present disclosure also allow for improvements in the quality of the process that was used to achieve the development the result, e.g., how good a job has been done by the time the development completes. Hence the present disclosure may concern both process and product measures. Consider the following scenario. A Development Team is working on a piece of software called App K. They have made commitments to their organization to deliver Version 2. And they are supposed to be shipping it by June 1st. They have committed to deliver nine major pieces of functionality. These may be represented using plan items in a development team collaboration tool or other development software.

They have identified the dependencies between those plan items, they have put in preliminary size estimates (i.e., estimates on the time to complete) for each of them in the form of triangular distributions where they specify the best case worst case and most likely case for each one and have broken down their timeline into three major milestones. Each of those milestones is approximately a month and a half. And each is then broken down into three iterations. And the iterations are three weeks each.

They have scheduled different plan items to be completed by the end of different iterations. And after the end of the third milestone, they feature freeze and then they will spend some time for stabilizing the system. This describes a process that is typical of development efforts.

The first part of this milestone is going well. The Development Team may use a graphical interface of the present disclosure (e.g., a dashboard) for performing, e.g., the status assessment, the diagnosis of problems, and the "what-if" analysis.

As of the end of the second iteration of the first milestone, a check in the dashboard (e.g., FIG. 9) may show that the project is going well. For example, in the top part of the dashboard is a section that gives insight into the overall likelihood of on-time delivery and how it has been trending historically. A status indicator may include the Gaussian curve in the upper left, labeled Likelihood of Shipping on Time. It shows the cumulative probability of delivering on or before the ship date of June 1st. In this example, it shows that there is a 91% chance that they will deliver on time, and a 9% chance that they may deliver late.

The dashboard may also show how the likelihood of on-time delivery has been evolving over time. This may be shown as a Delivery Date Risk Trend chart, in the upper right. This chart shows the range of dates that are likely—or that are possible for delivering, for example as predicted at the current time.

The above measurements may be made at the end of every iteration, for example, periodically such as monthly, or at the end of a milestone. The Delivery Date Risk Trend chart shows that after the first iteration there was quite a wide range of dates when it was possible that the team would have delivered. This may be so, since in the early going of a project, there will usually be a lot more uncertainty as to when a deliverable might ship, so there might be a wider range of dates. In one embodiment of the present disclosure, uncertainty is used as a measure of risk, so the more uncertainty as to the delivery date there might be, the greater the risk that the planned delivery date might not be met.

At the time of the first iteration measurement, the range was between April 15th and June 9th, with the most likely delivery date in the middle—about May 29. By the second iteration, the chart shows that the range of likely delivery dates has narrowed quite a bit, and that the delivery date has moved, in the most likely case, to about May 30. With the narrowing of the range of dates, the uncertainty has gone down. The risk has therefore gone down, which is what should be expected over time in a well-managed development process. For instance, in a well run process, one might expect that the team will be reducing their risk over time, and that, towards the end, they should have very little risk remaining and they should then deliver on the predicted date.

Over time, the most likely ship date should be converging on a single date, and the range of possible delivery dates should be narrowing in a well-run process. If the chart does not show the range of possible delivery dates reduce, or rather shows the range expand, then this serves as an early indication that the team may have process issues and/or is not working out a risk early, which in turn may be putting their on-time delivery at more significant risk.

The last chart in the top section of the dashboard is the burn down chart. A burn down chart shows when the individual pieces of work that are associated with the plan items have been completed over time (the smaller, grey dots each represent a work item that has completed), and when the plan items have been completed over time (the larger, green dots represent plan items that have been completed; the shadows of green dots show when plan items have been scheduled to be completed).

The line through the grey dots represents each piece of work (work item) that is being completed. Each plan item is generally broken down into smaller-scale pieces of work that are assigned to developers for completion. The line through the grey dots shows the percentage of work remaining, and it should be trending downward. Additional work may be added to the project, and in response to the added work, the chart may show the line going up, which may be an indication that there might be an issue as well.

The other line that goes step-wise down shows how the plan items, e.g., the major pieces of functionality that the team committed to, are getting completed. As each of those completes another colored (e.g., green) dot (representing a plan item) becomes solid and another step goes down.

Each plan item gets broken down into a set of work items. When it gets broken down, which may be at any time during the process, as the team progresses with work on that plan item, the total number of work items may increase, but over time the chart would show the total number of potential work items decreasing.

For instance, one might not usually break down all of the plan items up front into work items; one might often do it closer to the time when one will start working on the plan item. In this case, the chart might show spikes in the grey line as one is breaking the new plan item down into constituent work items, to reflect the increase in work remaining, but overall, it should be a small bump and should proceed back downward as the team burns off the work. The burndown chart may also show the plan items that have not been completed yet; they appear as ghost images (e.g., colored, e.g., green) at the time when they are scheduled to be completed, which provides for another early indication that a process may be in trouble: e.g., one is getting close to the due date for a particular plan item and the work is not close to being burned down yet for it.

The right side of the burndown chart may show a stack of committed work, i.e., the plan items. Each stack shows an indication of its status. The two on top, Plan Items 1 and 2, are completely colored (e.g., green), which means they are complete and you can also see that over on the left side of the chart. The ones below it are pieces of work that have not started yet or are in-progress. The in-progress bars can be seen on each of the plan items that are in progress. If they are still on schedule they will show such an indication, e.g., as colored (e.g., green). If they are in danger they will show as another indication, e.g., as differently colored (e.g., yellow), and if they are already past schedule, they will show as yet another indication, e.g., as differently colored (e.g., red). These plan items can depend on other plan items. If any of the plan items that are in progress or not yet in progress are in danger in any way, then the plan items they are blocking may also be highlighted as being in danger as well, because one cannot complete a dependent until one completes the plan item it depends on. Hovering over a plan item may show a tool tip that shows what other plan items depend on it, what work items are associated with it, and what its current status is.

If there are two plan items, A and B, and B depends on A, then if A is late, it could be that B is still looking like it is going to be in on time because B might not be due for a long time, e.g., two years. Therefore, it is a combination of dependency and knowing the due date. B will not automatically be in danger just because A is. That A is in danger is one of the factors that may be taken into account, for example, in addition to other factors such as the planned for date and planned for iteration. It may be also the case that B may have a very small dependency on A, e.g., short time (e.g., one hour) after A finishes, one can finish B, and hence the dependency might not be very significant. An algorithm that predicts completion time may look at the relationship between the work items.

Figure 10:
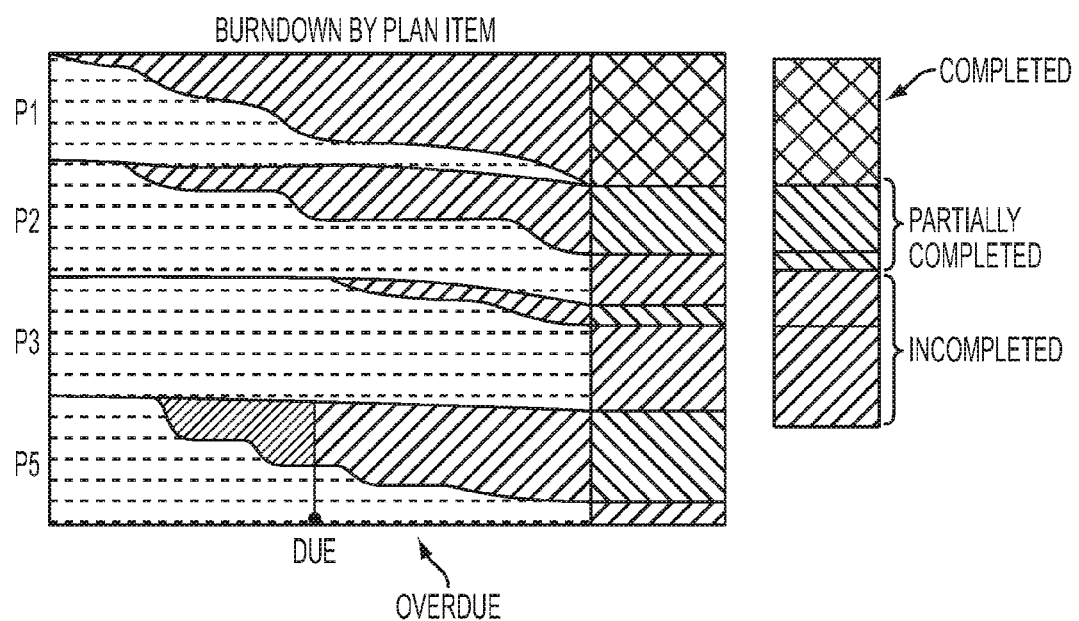
FIG. 10 illustrates a burndown chart shown by plan item (e.g., task) in one embodiment of the present disclosure.

The plan items burn down at a rate. The graphical user interface of the present disclosure may allow a user to zoom in then and look at the plan items as they are burning down, e.g., as shown in FIG. 10. If a plan item's work is burning down at a reasonable rate, there is no danger, and the graphics might show such indication, e.g., as green color. If it is running late or is already overdue, an indication may be shown in it that this was the due date and now it is overdue by some amount, indicating danger or lateness.

Figure 9:
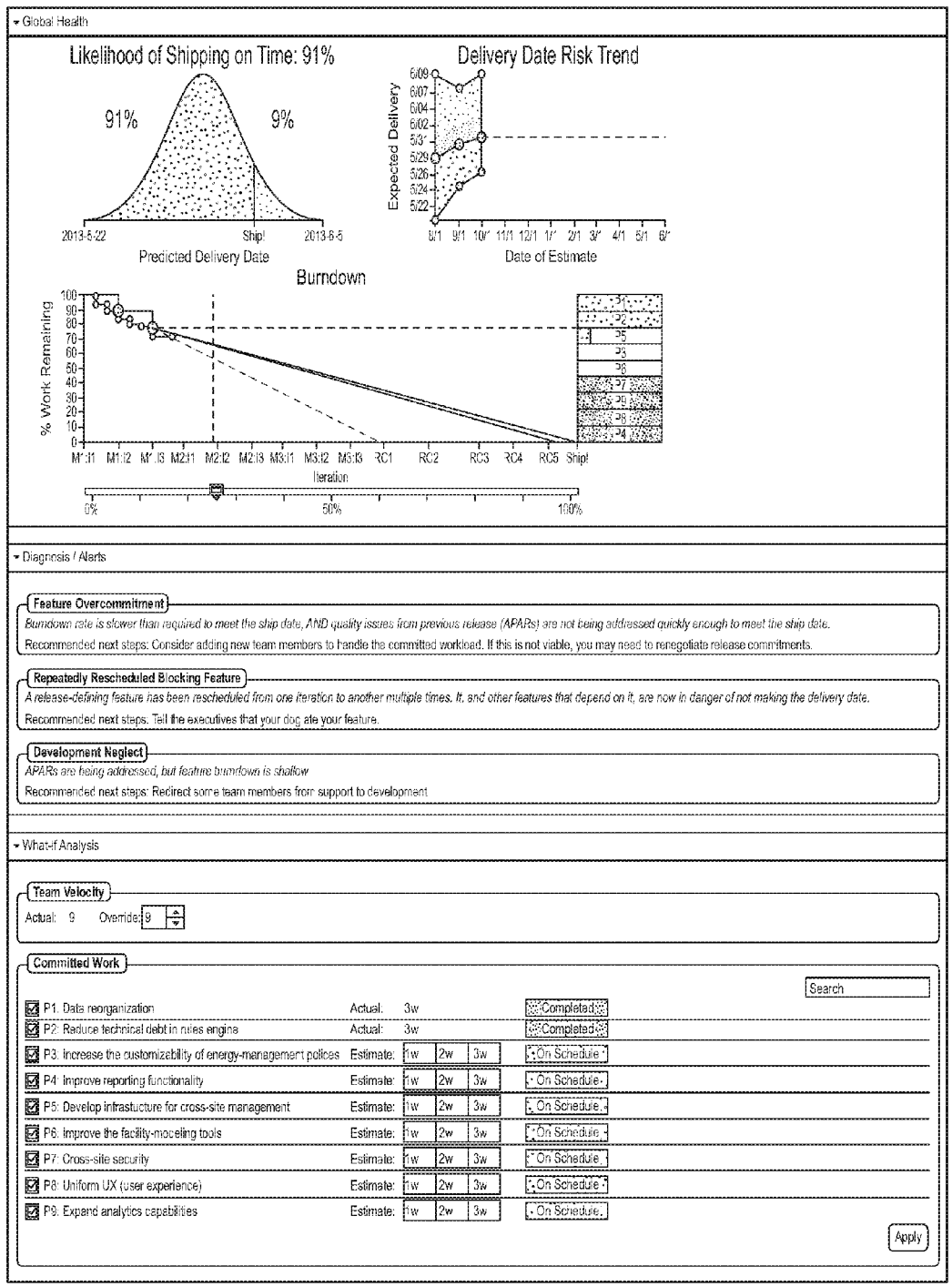
FIG. 9 is an example screenshot of a graphical user interface of the present disclosure in one embodiment.

The example graphics of FIG. 9 shows the projected burndown of work from current time going forward. This is the predictive part, going forward from the current date. The predictive part allows a user to understand what the most likely outcome is and what the range of possible outcomes are. The burndown chart in FIG. 9 also shows the range of dates during which one is currently projected to possibly deliver on the commitments.

FIG. 9 shows a "cone" going forward from the current date. This represents the most likely outcomes possible, the best outcomes possible, and the worst outcomes possible for delivery, which provides a predictive range of dates for delivery, illustrating the likelihood that the different plan items will deliver during that range of time.

Whenever a plan item is rescheduled to a different iteration, the graphics may show updates in the burndown chart and the burndown by plan item to reflect the rescheduling action.

Consider that in the above scenario that the same project example now has progressed about a month and a half. At this point there are some strong indications that the project has run into trouble. The status chart is showing that there is only a 30% chance currently that the project will complete on time. The probability trend shows that where the risk and uncertainty had been reducing on the delivery date over time, now suddenly in this last iteration, it has increased and the most likely date for shipping has moved out very significantly. The project is now predicted to ship in October while it is due in June.

The burndown chart shows a flattened curve. It has stopped dropping a while ago representing that work is not being burned off. In the stack of plan items, Plan Item 5 is indicated as past due, e.g., shown in red color (another color ore indication may be utilized). Similarly, Plan Item 3 is showing red (or another such indication) indicating that it is also past due. The plan items that depend on Plan Item 5 and Plan Item 3 are all now showing that they are in danger.

In one aspect of the present disclosure, a diagnosis methodology may be provided to determine a problem that might be the cause that prevents a timely completion, for example, in the above example scenario, what has gone wrong. Problem diagnosis in one embodiment of the present disclosure may leverage historical information. Issues may be diagnosed that are putting a project at risk for not delivering its commitments on time. Guidance may be provided into remediation actions that may help put the project back on track for delivering on time. The problem diagnosis in one embodiment of the present disclosure may discover patterns from data and also identify what has been done previously and how well it has worked.

In one aspect, a method for diagnosing issues may comprise gathering historic and current development data, e.g., including sets of work items with work item attributes. A catalog of patterns may be obtained. A pattern describes a particular constellation in the development data, one that either exists at a discrete point in time or one that arises over time. For example, the continual arrival of new work items is a pattern that manifests itself over time. The rescheduling of a work items to a later point in time such as a later iteration (i.e., delay of a work item) is a pattern that arises at the time of the reschedule. For each pattern, there exists a data measure and an analysis routine capable of detecting the presence of the pattern in a given data set. For example, for the continual arrival of new work pattern, the associated metric and analysis routine would process work items to detect newly added items in order to track them over time. The associated analysis routine is specific to the pattern and is designed as part of the definition of a pattern.

For each pattern in the catalog, the method may comprise retrieving the associated analysis routine, applying the associated analysis routine to the data to identify the presence of the pattern, and each time the presence of the pattern is identified issuing a notification to a user.

In one embodiment of the present disclosure, guidance into remediation of issues may be provided, for example, in the issuing of the notification. For example, issuing a notification to a user may include providing a description of the identified pattern to the user, providing an explanation (e.g., visual via a GUI) of where in the data the pattern was identified, providing guidance that is associated with the identified pattern on how to remediate, providing historic information about past instances of the pattern in different contexts along with information about the outcomes for each instance, or any combination thereof.

A GUI may show a dashboard (e.g., FIG. 9) with an area that contains the issue diagnosis section. In one embodiment of the present disclosure, a problem or issue may be diagnosed by identifying patterns. The patterns represent common situations that arise in a project, e.g., in development. The diagnosing of the present disclosure may identify them from the data. The patterns in the data reflect common development issues that can arise in either the product or in the process by which it is developed.

Patterns indicate what could have gone wrong and what should be done about it. An example pattern may be identified that indicates that the risk has not been reducing, although there is an expectation that the risk continues to reduce. This may be a sign that the process has gone astray.

There may be reasons why this might happen. One is that the team did not do a very good job of scheduling their risky work to happen early. And so now they are taking on risky work later in the process which is putting the whole delivery schedule at risk. Another reason that one might see the risk not reducing is due to scope creep, which means that the team committed to a certain amount of work early, but they started expanding the work that they were planning on doing. And so they have taken on more and more work. And therefore that has put the project completion schedule in danger.

The patterns that are diagnosed can be independent or they may be related. In this particular case, the second pattern is the cause of the first one. But they may not be related, e.g., there may be different problems going on in the project. A user may verify whether that is the case.

Another example pattern may be feature burnup. For example, Plan item 5 is showing a bunch of problematic signs that suggest it was a much more significant and higher risk piece of work than the team originally realized:

The actuals are not aligned well with the estimates. Plan item 5 was estimated at four weeks of effort, but seven weeks have already past and it is not close to done yet and there is no end in sight.

More and more work items keep being associated with this plan item, and the new work is increasing faster than the team is actually managing to close the work out.

This plan item appears to be an architecturally significant feature, because the code changes that have been delivered that were associated with Plan Item 5 have touched on most of the components of the system which means this is probably a large scale, cross-cutting feature. Such architecturally significant features are much more risky.

Based on the above, it may be detected that the feature burnup is a real problem. Plan Item 5 clearly was not well understood when it was scheduled, and it is turned out to be much more substantial than was anticipated.

For each pattern that a diagnoses methodology of the present disclosure identifies, the pattern description may also indicate historical context: how often has that pattern been seen in the past; what have the consequences been when it was seen in the past; what actions were taken to address it previously and what were their outcomes; and how often is this pattern currently being seen across the portfolio.

If a detected pattern indicates that more work items are coming in than are being closed then it is an indication of feature burnout. Two metrics may determine this pattern. One metric may be the arrival rate which is the number of new work items that have appeared. The other metric may be the closure rate which is the number of work items closed. The relationship between the two indicates a feature burnout pattern.

A reduced team capacity pattern may be detected where the team suddenly starts closing fewer work items even though the arrival rate did not change.

The example of the "risk not reducing" pattern is a pattern that can be identified up front because one is given a dependency, the dependencies between the plan items, and when they have been scheduled to complete. Given such information, it is possible to determine early in the development process or project process, that there is a case where risky work has been left until the end.

Another example pattern may be a Repeatedly Rescheduled Blocking Item pattern. And for example, the same Plan Item 5 may be flagged in this pattern. This may be part of the same issue that was indicated in the above example. Plan Item 5 was not completed by its original planned-for date. It was rescheduled once, not completed, and now it has failed to complete again and has been rescheduled again. Its latest reschedule date has now endangered all of the plan items that depend on it, because they have all had to be moved out, as well.

In this particular example case, the program manager gets involved and discusses the situation with the technical lead. They determine that Plan Item 5 represents a much more significant feature than had been anticipated. They decide that they will need to take action to get back on schedule because they really do not have time to finish Plan Item 5 as it was originally planned, plus all the remaining work, given what they now know of how much larger its scope is and how much time remains.

The following illustrates example patterns that may be identified in the present disclosure for diagnoses, for instance, as issues that threaten on-time delivery.
Feature burn-up: The work associated with a plan item (feature) continues increasing beyond its estimated scope and/or planned-for date.
Repeatedly rescheduled (blocking) feature: A committed plan item (feature) is rescheduled repeatedly beyond its original planned-for date, putting the feature at risk. If this feature blocks others, the situation is more critical.
Feature overload: The team has committed to deliver more scope than they are projected to have resources to complete by the delivery date.
Residual uncertainty not being worked off: The variance around the most likely delivery date is not decreasing—or is increasing—over time.
Scope creep: Expanding the planned work.
Excessive "under the radar" work: A considerable amount of work associated with the release is not associated with committed work (plan items).
Robbing Peter to pay Paul: Moving people from development to support reduces likelihood of on-time delivery.
repeatedly rescheduled item: A work item has been rescheduled more than once.
Example variants: schedule delayed, schedule advanced.
rescheduled blocking item: A work item that blocks other work items has been rescheduled
Example variants: schedule delayed, schedule advanced.
Support problem target divergence: The level of open support problems is trending away from the target level.
Development defect target divergence: The level of open development defects is trending away from the target level.
Exceptional event: An exceptional event has occurred that affects analytic results.
Seasonal event: A known seasonal event has occurred that affects analytic results.
Stable: The analytic results are stable.
Not found: No pattern found.
Failure to communicate: failure to communicate detected.
Overload induced by decreased capacity: Work overload has been observed during a period of reduced capacity for work.
Overload induced by increased work: Work overload has been observed during a period of increased quantity of work.
Increasing risk to on time delivery: Risk to on-time delivery is increasing.
Increasing risk to on quality delivery: Risk to on-quality delivery is increasing.
Scope creep due to new plan items: Work scope is expanding due to the creation of new plan items.
Scope creep due to adopted plan items: Work scope is expanding due to adoption of reassigned plan items.
Late elaboration of plan item: Work to address plan items has been elaborated at a late stage.
Failure to meet roadmap target: Plan item has failed to meet a roadmap target.
Repeatedly rescheduled roadmap targets: Plan item roadmap targets have been repeatedly reset. Item slipping due date: A work item has not been finished by its assigned due date.
Item slipping estimated hours: A work item has taken more time than its estimated hours. Item depends on slipping blocker: A work item depends on an item that is slipping its due date or estimated hours.
Reduced scope: Reduced scope of work.
Reduced scope due to reduced item: Reduced scope of work due to one or more reduced items.
Reduced scope due to dropped item: Reduced scope of work due to one or more eliminated items.
Shifted capacity: Work effort has shifted from one area to another (e.g., from development to support or vice versa).
Pattern increased velocity: The rate at which work is being completed has increased.
Example variants: improved efficiency, more time spent, overestimated work.

The above example patterns are not exclusive, for example, two or more can apply at the same time. Combinations of more basic patterns may be used to define composite patterns, e.g., repeatedly rescheduled item and rescheduled blocking item together give a repeatedly rescheduled blocking item. Some of the "patterns" may refer to single events. An issue affecting patterns generally is the scope over which they apply, e.g., release cycle, milestone, or iteration. This may be addressed by definition of a pattern or as a configurable parameter on a pattern. Another issue is patterns that may apply to individual items or to multiple items, e.g., repeatedly rescheduled item(s). This pattern could apply to an individual item, or it might only be recognized if it happens to, e.g., three or more items. Parameters in general may have configurable parameters for factors like scope, threshold levels, and other factors. Different patterns may be associated with different kinds of detailed information, e.g., number of times rescheduled, or amount of time past due, or degree of increased risk, or amount of scope creep, etc.

Continuing with the above example scenario, the next thing to do, now that they know what is gone wrong, is to try to find a workable solution. To do that, they may use the "what-if" analysis, e.g., shown in the dashboard (shown in FIG. 9).

What-if analysis in one embodiment of the present disclosure may simulate the effects of changing a predefined set of parameters on the predictions of delivery date distributions. A set of parameters that can be manipulated for What-If analysis may include, but is not limited to: delivery date by providing a specific data, team velocity by providing a change amount to the current team velocity, scope by deleting, adding or modifying scope commitments in the form of plan items, and other parameters.

A what-if analysis method in one embodiment may include specifying a new delivery date parameter for the project, specifying a change in the team velocity parameter, specifying a change in scope commitments parameters by adding, deleting or changing a scope commitment in the form of a plan item, or any combination thereof. The method may also include saving all current predictions, diagnosed patterns, and notifications. The method may further include recomputing the predictions of the likelihood of delivery based on the changed parameters. The method may also include re-running the pattern diagnosis method based on the changed parameters. The method may also include surfacing the new results of re-computations (the what-if exploration) to a user, for example, using the GUI. The method may further include offering the user a choice to (i) save the what-if exploration, (ii) discard it, (iii) continue with another what-if exploration, or (iv) globally commit as an expert assessment. If the user chooses (i) to continue with another what-if exploration, the steps may be repeated.

If the user chooses (ii) to discard the what-if exploration then the original saved predictions, patterns and notifications may be restored or recovered.

If the user chooses (iii) to save the what-if exploration, then the what-if exploration may be saved by storing the change in parameters and all changes in the predictions, newly detected patterns and notifications. A handle may be provided for the saved what-if exploration that can be used by anybody to retrieve the what-if exploration.

If the user chooses (iv) to globally commit the what-if exploration as an expert assessment then all parameter changes may be committed globally (e.g., visible to all users) to the globally shared state such that any changes in the predictions, newly detected patterns and notifications will surface in the GUI view of all users.

Further, a method may be provided for comparing the effects of a multitude of alternative next steps that a development team can take in order to progress a development project. The next steps may be actions to remediate a currently present issue or problem in the development project, or they may be potential actions to improve the productivity of the development team.

The above what-if analysis may be performed to save a multitude of what-if explorations and a handle for each what-if exploration may be obtained. Various aspects may be compared among all saved what-if explorations by retrieving the saved what-if scenarios using the obtained handles.

Referring to FIG. 9, a GUI in the present disclosure may present in the "what-if" analysis section, different "knobs" or another user interface, that a user can turn or operate on. One knob may be to change the expected team velocity, e.g., the rate at which the team is burning down work. In the example shown, the team's velocity is about nine story points per iteration.

As an example, the program manager can choose to put additional personnel onto this project to help it get back on schedule. The manager may then figure out how the addition of those people is going to affect the team's velocity. The manager then can enter into the "override" field what she expects, e.g., that the new velocity will be 14 story points per iteration. When she clicks the apply button, the likelihood of on-time completion may be recomputed and shown in the top part. The program manager might see that this increase in velocity would increase the probability of on-time delivery to 45%. This prediction may be better, but it might not be high enough to consider it by itself to be a workable solution, as the team would still be more likely to fail than succeed.

The manager might then move down to the committed work part, which has a list of all of the plan items. It shows the current estimates for the size of each of them and a check box next to each of them, as well, which means they are all currently selected and are used in computing the probability of on-time completion.

The manager may deselect some of the plan items, and the manager might see the probability of on-time delivery for a subset of the work that the team has committed to. This can be useful for a number of different things, including figuring out whether a subset of plan items is likely to complete on time.

In this particular case, the program manager is going to use this capability to identify pieces of work that she can take out of scope for this release to improve its chances of delivering on time. In looking at the dashboard, she sees that the most critically endangered piece of work is Plan Item 4, which is the furthest out dependent of Plan Item 5. It also turns out that the business case for plan item 4 is not very strong, so it is a good candidate for omission. She can deselect Plan Item 4 and click the apply button, and then she discovers that the probability of on-time completion has increased to 55%.

The manager also sees that Plan Item 5 is estimated as 12 weeks, 15 weeks or 21 weeks in best case, expected case and worst case. She knows at this point that they are going to cut Plan Item 5's scope significantly and not do all of the work for it that they planned to do because it is too complex.

So she changes that estimate to be smaller. And she then reduces the estimates of two of its dependent plan items, 7 and 9, both of which can now have smaller scope because they no longer need to include functionality that was specifically required for Plan Item 4, as it is now out of scope.

She reduces those estimates as well, and clicks the apply button. And now she sees the probability of on-time delivery is 72%. This is in her comfort zone and within her organization's process guidelines for risk management. She and the development team agree this is a viable technical solution.

Referring to the team velocity, one way to manipulate team velocity may be to put people who are not working 100% of the time in this project to full time. Another example is to add new people to this project. Getting people to the process may or may not be effective because if the process is completely serialized no more people can be usefully added. The methodology of the present disclosure may determine which pieces of work could be parallelized and determine anticipated effect on the team velocity.

Another aspect of the present disclosure may include expert assessment. Expert assessment may incorporate user insights, in a principled way, into predictions of on-time completion when the users know something that will eventually be visible, but is not yet visible. For instance, a user may be enabled to contribute knowledge, which is not yet visible to the prediction methodologies of the present disclosure, but which could affect predictions that would be made if the information is known, and to incorporate this information safely into predictions. Thus, a method may enable users to specify information they know, in a form that can be incorporated into the prediction algorithm, to validate user-specified information, and also to synthesize both automatically gathered information and user-specified information to produce predictions, diagnoses, and what-if analyses.

A method for enabling one or more users to specify information, for example, which information potentially affects predictions, diagnoses, and what-if analyses, and incorporating this information into predictions, diagnoses, and what-if analyses, may include gathering information that enables making predictions, performing diagnoses, and performing what-if analyses. This information may be surfaced to one or more users. For some or all of these pieces of information, one or more users may be enabled to input a new value that they believe to be more accurate, and to indicate the period of time when they believe their information will be applicable.

Examples are provided as follows:

Using expert assessments for prediction: If a prediction methodology has learned that the team has 4 developers and the user knows the team will get 2 additional developers starting on June 1, the user could indicate that the number of developers will go up from 4 to 6, starting June 1, and remain at 6 for 2 months. The prediction algorithm could then take this information into account in making predictions about how future work will complete.

Using expert assessments for diagnoses: If a diagnoses methodology has diagnosed a "feature overload" pattern, indicating that the team has taken on more work than it has personnel to finish in the allocated time, the addition of the 2 additional developers may be sufficient to clear this pattern. Conversely, if a user knows that two developers are being pulled off the team for a month to address a customer crisis, this information may cause the diagnoses methodology to diagnose a "feature overload" pattern that it would not have recognized until much later without this information.

Using expert assessments for what-if analyses: Expert assessments and what-if analyses may be used together to determine the likely outcome of a possible action (what-if), and then to alert a what-if analysis methodology that the what-if scenario has been put into place.

An expert assessment may comprise one or more such pieces of information. Users can combine pieces of information into a single expert assessment. They may also offer rationales for why they believe they are correct in their assessment.

The expert assessment may be saved (made persistent). An existing what-if scenario can also be "promoted" to an expert assessment by saving it as an expert assessment. A user can choose to apply one or more saved expert assessments, to their own view of GUI and/or to the views that others see. Given one or more saved expert assessments, the expert assessment methodology of the present disclosure may show the effects of applying the assessment(s). This may be done at different levels of granularity, and it may be shown in addition to, or instead of, the predictions, diagnoses, and what-if analyses without expert assessments.

For predictions, the predictive algorithm is rerun, substituting information from the expert assessment. For diagnoses, the diagnostic algorithm is rerun, using as input the modified predictions and the information from the expert assessment. For any what-if analyses that a user has active when a given expert assessment is applied to their own view of the GUI, the what-if analysis algorithm is rerun, substituting information from the expert assessment, to ensure that the what-if analysis reflects any active expert assessments.

For each piece of information provided in a given expert assessment, the expert assessment methodology of the present disclosure may gather more data to determine whether the user's assessment was correct.

For example, if a user inputs that additional two developers will be added to the project starting June 1, it should be seen that at that time, two new developers are put on the project, assigned to tasks. If this does not happen, the expert assessment methodology of the present disclosure in one embodiment determines that some or all of the given expert assessment is not valid, communicates this to the users, and discontinues using all or part of this expert assessment. At that point, predictions, diagnoses, and what-if analyses are shown without the expert assessment, or with only the subset of it that is still valid.

Continuing with the above scenario example, consider that the program manager's intervention has put the team back on track. They stayed that way through the end of the second milestone. At the end of the first iteration of the third milestone, though, the dashboard is showing some new problems in the top part, the global health assessment (e.g., see FIG. 9). It can be seen that the project only has a 52% chance of delivering. Consider that it is now the end of December, and it is within a month of the feature freeze date, so very little risk (uncertainty) should remain at this point.

Consider that the burndown chart shows risks in Plan Items 7, 8 and 9 (e.g., show those plan items in yellow which means they are at risk although not yet late). Consider also that the trend chart is showing that where the variance had continued reducing through the end of Milestone 2, it increased unexpectedly at the end of the previous iteration that just finished.

In the diagnosis part of the dashboard, a feature overload is seen due to reduced capacity pattern showing in addition to the "risk not reducing" pattern. The "feature overload due to reduced capacity" pattern means that the team's burndown has slowed. And it is no longer consistent with an on-time delivery because the task work item net closure rate has dropped off.

Consider that at this point, a technical lead sees the problem. He knows why this happened: two of his team members were pulled off during that previous iteration to address a customer critical situation in support, and two other team members had taken a vacation due to the holidays. As a result, Plan Item 7, which should have just finished in the iteration that just completed, is now running late. This is what has endangered Plan Items 8 and 9, as they depend on plan item 7. Because all of the team is back working on this project again full time, the critical situation is finished and no other vacation is planned, the technical lead also knows the team is going to put in an overtime in the next few weeks to catch up. So he is certain that this was just a one-time anomaly, and that App K's delivery date really is not in trouble. However, the data does not show this yet; the data suggests that the release date is in jeopardy.

The technical lead needs to make his expert knowledge visible. So he opens the expert assessment part of a GUI dashboard. He first creates an event annotation on the burndown graph, which indicates that the iteration that just closed had a "one-time reduced team capacity" event. He puts in an explanation for why he believes this. Anyone else who looks at the dashboard will see this event annotation and understand that an unusual event happened. Then, in the expert assessment section, he creates new expert assessment and indicates in it that although the team's velocity recently has been just 4, which is quite low, he is expecting that it will increase to 20 for the upcoming iteration, due to the overtime the team will put in to catch up. In the subsequent iterations, he indicates that he expects the velocity to drop back down to 14, where it had been previously, before the problematic last iteration.

So he has just quantified his knowledge of what happened, and he quantified the expected impact of that knowledge on the project going forward. He can share this expert assessment with his team. They have the ability to click a button to say that they agree or disagree with it. They believe this is a correct assessment, so they agree.

When people agree with the expert assessment, it is applied to their view of the project, so the technical lead and the team now see that the probability of on-time completion with his expert assessment would be 80%.

The technical lead can share his expert assessment with other people, but he does not himself have permission to make his expert assessment the default for everyone who is looking at this project's dashboard. So he submits it upward to the program manager, who also agrees with it and she submits it to the executive who is in charge, and who does have the authority then to make the default view. The executive agrees and promotes the expert assessment to the default view. Because the team lead has quantified his knowledge and its projected impact on the project, the expert assessment methodology can automatically check and verify to see whether his quantified knowledge is true as more information comes in.

If the expert assessment methodology discovers by the end of the next iteration that the team did not actually burn off 20 story points, it can then mark this expert assessment "invalid" and inactivate it, and it will no longer be used in computing the probability of on-time completion. If it turns out that the expert assessment correctly predicted what would happen, it will be marked "valid" and it will be expired at the end of the period to which the technical lead indicated that it applies, as it will no longer be needed—the data itself will cause the correct probability computations to occur. But the technical lead will be able to use his successful, validated expert assessment in the future, to help support future expert assessments he offers in other situations where he believes he knows something more than the data is showing. And it will help people to trust his judgment on that.

Consider that a couple of iterations later, the actual data came in and his expert assessment was accurate. The data has validated his assessment.

The ability to incorporate people's expert knowledge into understanding the likelihood of on-time delivery is an important capability. People's deep expertise in the area has given them insight that is not yet visible in the data. Hence, the expert assessment methodology of the present disclosure enables people to get involved and the expert knowledge involved in the predictions, and to do so in a principled and verifiable manner. For instance, once the expert assessment is quantified, the verification may be performed automatically in the methodology of the present disclosure. People who demonstrate deep knowledge and strong insight will have greater opportunity to contribute their knowledge and have it incorporated in a principled manner in the analytics results.

The methodologies of the present disclosure provide information (e.g., by computing probability, performing diagnoses, what-if analyses, and expert assessment, e.g., via a GUI) at different points in time during development. The visualization may also provide the ability to go back in time through the use of a time slide. Using the time slide, a user (e.g., the product manager) can go back in time and play forward the development history (to the current date), thereby visualizing how the changing likelihood on-time delivery evolved in time. The manager can go back to any point in time to inspect the detailed status of that point in time to compare it with the current status.

The above described methodologies may be provided in a system of an integrated tool, that enables a user to compute probability distribution of estimated completion time of a project, perform diagnoses, what-if analyses, and expert assessment, e.g., via a GUI that also may provide associated graphical presentations.

A full set of capabilities were described above with an example scenario. The probability prediction described above, for example, may take as input, the plan items. A triangular distribution of the time it takes to complete the work on those plan items may be produced by an estimator. Plan item dependencies may be also provided as input. As the project is going along, how the actuals (actual times it took to complete work) compare to those estimates can be determined. A Monte Carlo simulation may be run to compute the expected range of the whole schedule, for example, subject to constraints such as the number of team members available for work, and e.g., task parallelism.

In one aspect, a user supplied estimate on the plan items may be utilized initially but as the work unfolds, the distribution of closure times on each of the pieces of work may be realized. Using similarities between plan items and associated variances, distribution of estimates may be computed. Then based on that distribution, empirical estimates may be produced of the work items that are consistent with the parent plan item's overall estimate. The original user supplied estimate on the plan item may be updated to be more consistent with the actuals.

Hence, the user estimates and the empirical estimates may be utilized in techniques such as the Monte Carlo simulation to predict the range of outcomes.

While the above methodologies were described with reference to plan items which contain work items, the methodologies may apply to higher level constructs like milestones which might be multiple plan items, for example, creating a hierarchy. Any number of levels can be contemplated. For example, there may be stories and then work items and then smaller scale work items that can also be accommodated in the present disclosure.

To reiterate, one or more methodologies of the present disclosure may compute project ship date (e.g., predict probabilistic completion date of a project), compute and provide confidence level of the computation, provide visualization into the progress of a project broken down by work item components, provide updated prediction incorporating the progressions already made, provide predictions as evolved and evolving over time, and show whether the risk of completing the project on time is decreasing or increasing.

Figure 11:
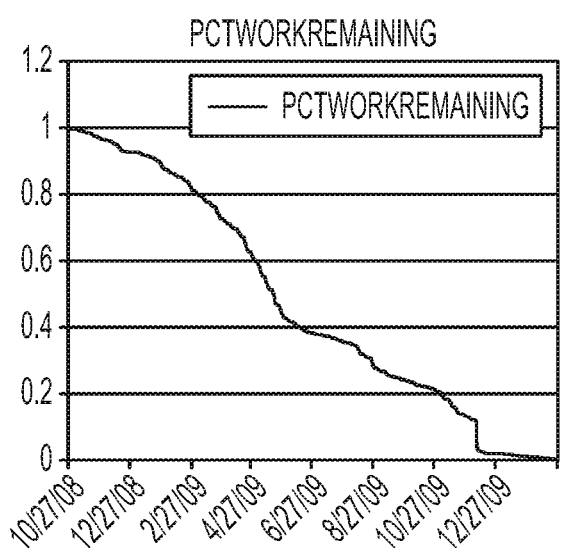
FIG. 11 illustrates another example of a burndown chart showing work remaining in a project, in one embodiment of the present disclosure.

A progress of a project, for instance, may be measured in a burndown curve that plots work remaining as a function of time. FIG. 11 illustrates an example of a burndown chart. Such burndown chart may include color code indications. Other graphical codes or indications may be utilized to convey different representations. By following a burndown curve to the x-intercept (in this example chart, e.g., somewhere around January 2010), the delivery date can be found. That is the date when all work is complete (0% work remaining).

Figure 12:
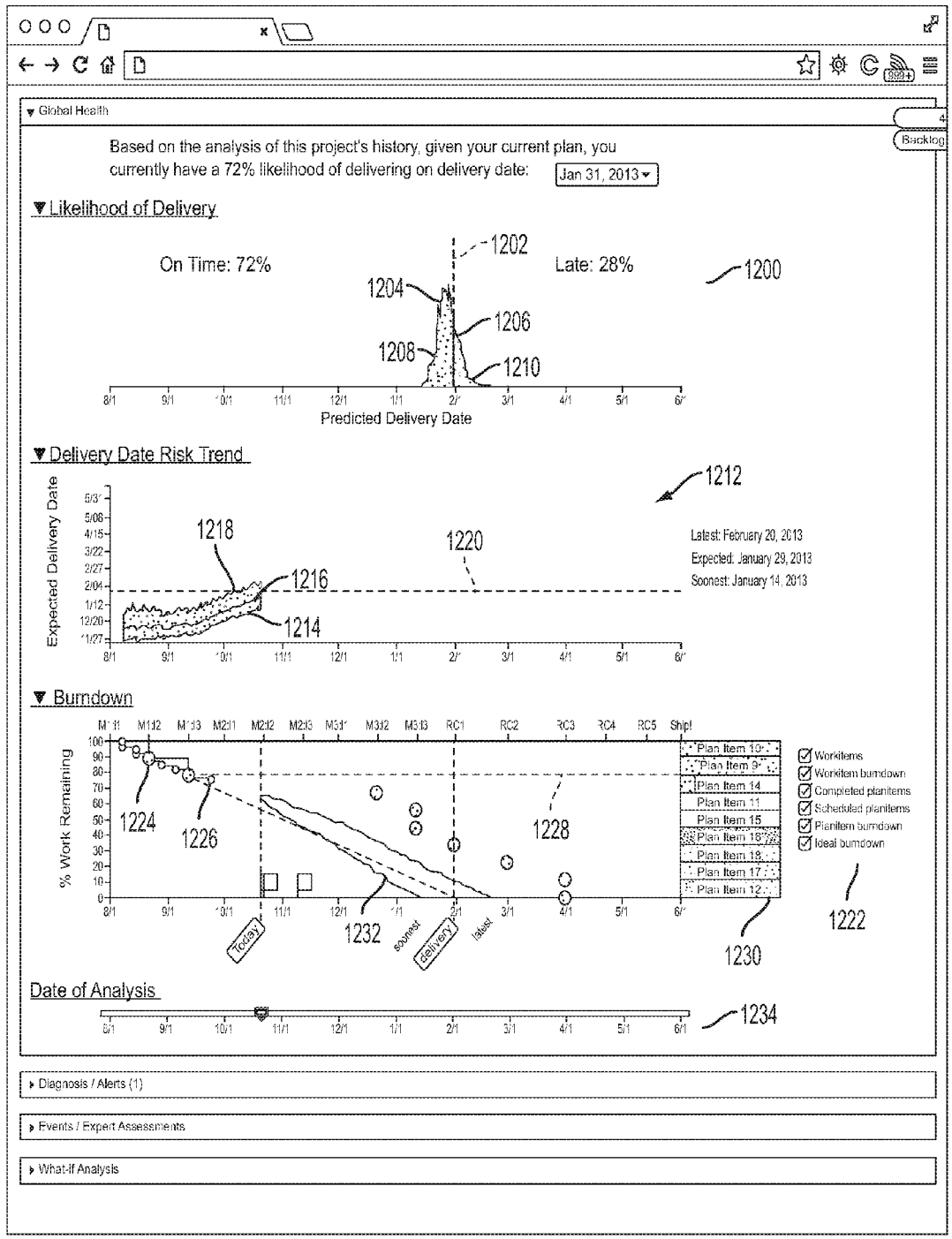
FIG. 12 illustrates an example of a GUI screen shot in one embodiment of the present disclosure.

FIG. 12 illustrates an example of a GUI screen shot in one embodiment of the present disclosure. The top chart, labeled "Likelihood of Delivery" 1200 presents a probability distribution of predicted delivery dates based on running the simulation using data provided by the user. The vertical dashed line 1202 represents the planned delivery date as provided by the user. The GUI may be color coded or other graphical attributes may be utilized for display. For example, the green 1204 and red 1206 curve represents all dates that the simulation has predicted on which planned work will complete for the given project. The higher portions of the curve represent those dates that were predicted more often than the lower portions of the curve. The green area 1208 of the curve represents all predicted dates that fall on or before the planned delivery date. The red area 1210 of the curve represents all predicted dates that fall after the planned delivery date. Different colors or visuals may be utilized to provide such information.

Figure 13:
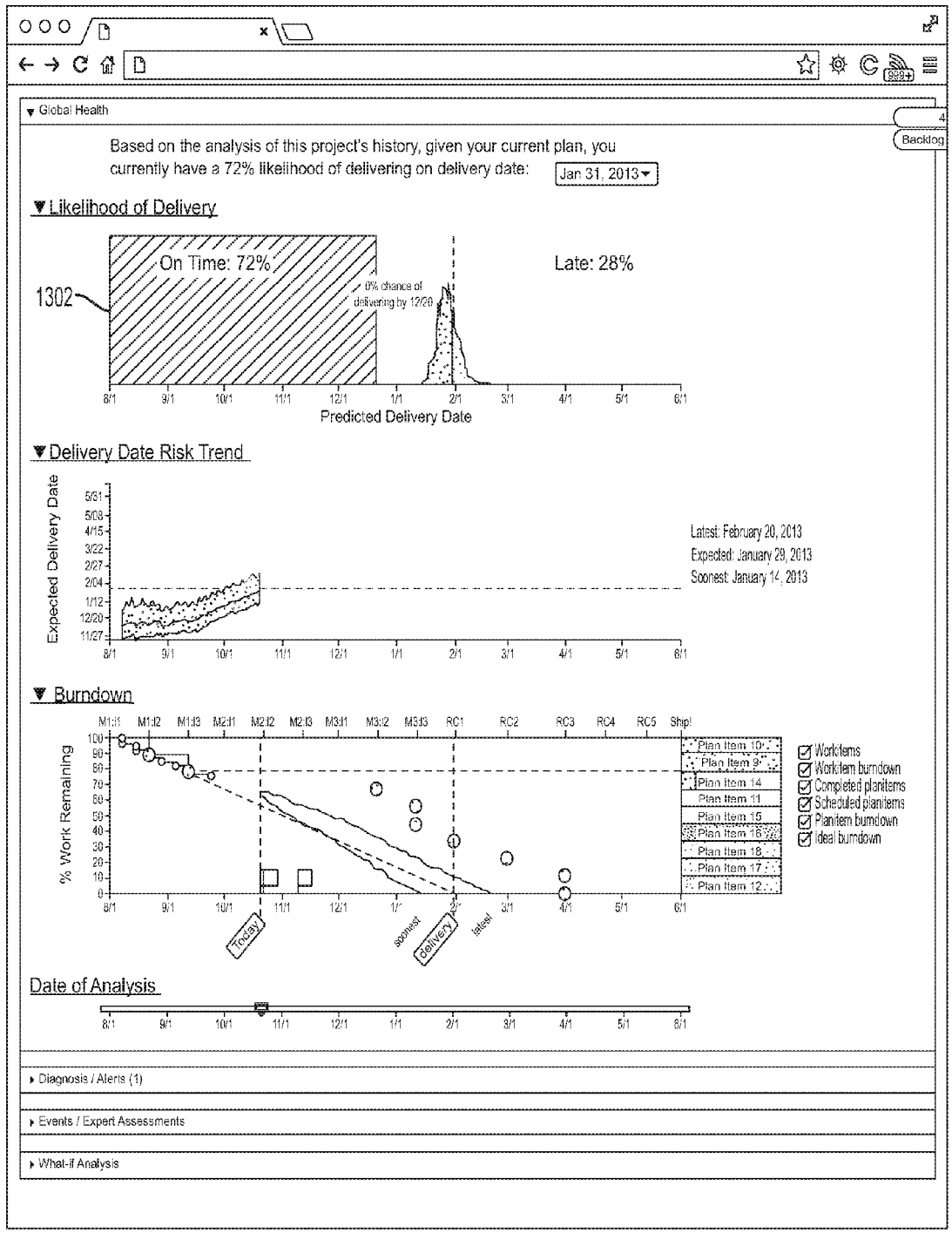
FIGS. 13-15 illustrate an example of the "Likelihood of Delivery" chart as the user moves the mouse (or another input or pointing device) over the chart in one embodiment of the present disclosure.
Figure 14:
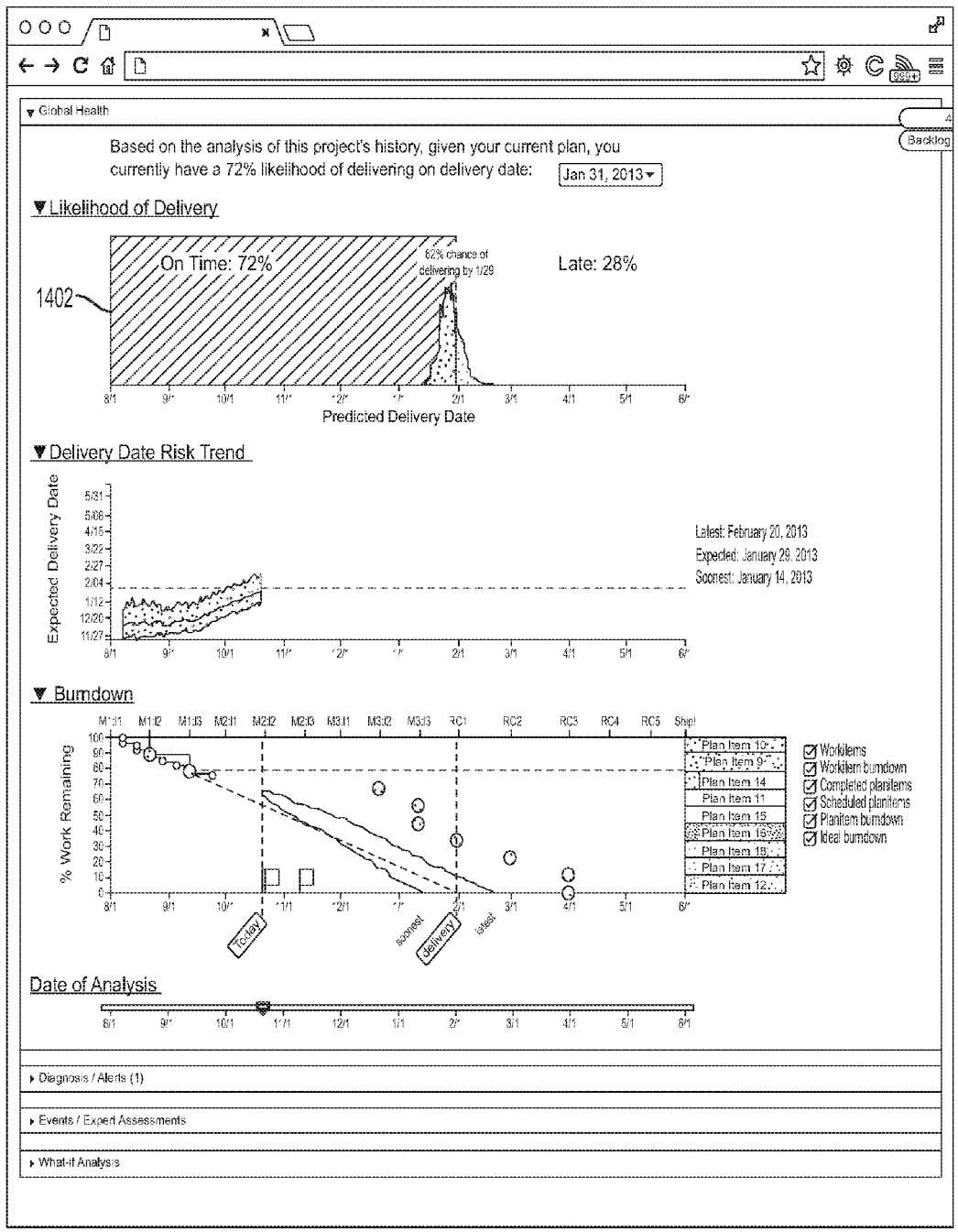
Figure 15:
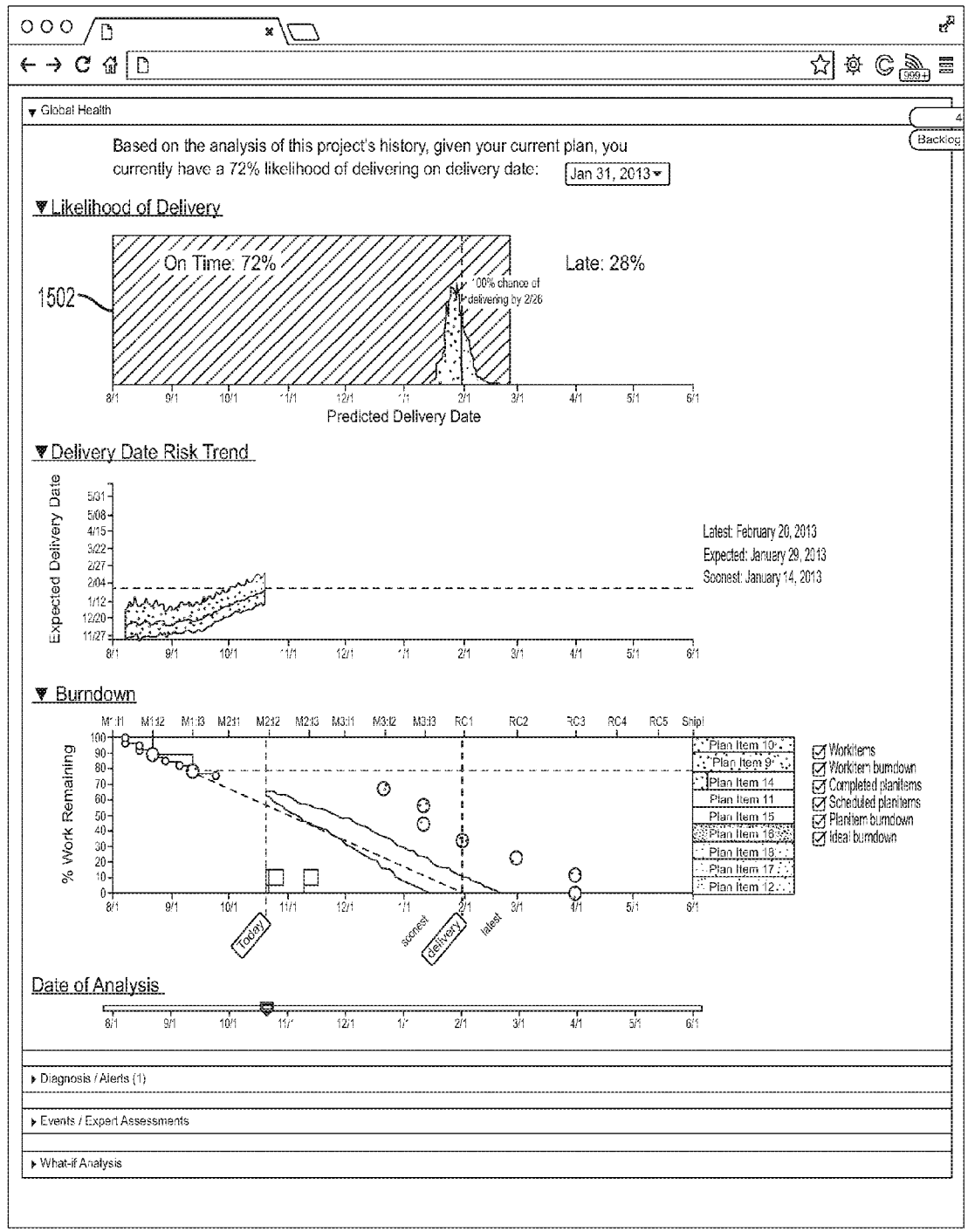

FIGS. 13-15 illustrate an example of the "Likelihood of Delivery" chart as the user moves the mouse (or another input or pointing device) over the chart. The blue area (shown at 1302, 1402, 1502, which can also be shown with different visuals (e.g., different color, another visual effect or indication) represents a cumulative probability of the delivery occurring on or before the date selected by the current pointer position. Areas to the left of the curve will have a cumulative probability of 0% since all predicted delivery dates fall after those dates. Areas within the curve will have a cumulative probability of the sum of all probabilities occurring before or on the current pointer position. Areas to the right of the curve will have cumulative probabilities of 100% since all predicted delivery dates occur prior to the current pointer position. Thus, the chart displays both a traditional probability distribution in its static mode and a cumulative probability distribution in its interactive mode.

Referring to FIG. 12, the middle chart labeled "Delivery Date Risk Trend" 1212 shows how the predicted "Likelihood of Delivery" has changed over time. As the timeline of the project progresses, a methodology of the present disclosure calculates predictions of completion dates based on information available at the time and those predictions are stored. The "Delivery Date Risk Trend" chart 1212 maps those predictions over time to show how those predictions have changed. Three lines are drawn on the chart from left to right to represent the predictions made on each date of the project. The lower line 1214 represents the earliest predicted delivery dates for each of the predictions made, the middle line 1216 represents the most likely predicted delivery dates, and the upper line 1218 represents the latest predicted delivery dates. The horizontal dashed line 1220 represents the planned delivery date for the project provided by the user. The area between the earliest and latest delivery dates is colored (or presented or displayed with another visual) to represent the status of the predicted dates: dates before the planned delivery date are shaded in green, dates near the planned delivery date are shaded in yellow and dates after the planned delivery date are shaded in red. The actual dates of the current prediction are represented on the right side of the chart using the same color coding (or another visual coding) as the shading just described.

In FIG. 12, the bottom chart labeled "Burndown" 1222 shows a modified burndown chart for the current project using data provided by the user. The vertical axis represents the percentage of work remaining on the project. The bottom horizontal axis represents the timeline for the project in dates and the top horizontal axis represents the timeline for the project in milestones and iterations as provided by the user. The gray circles (1224) on the chart represent work-items or units of planned work that have been completed for the current project. Their horizontal position represents the date on which the work was completed and their vertical position represents how much work remains to be done on the project now that that work has been completed. The larger green dots (1226) on the chart represent plan-items or planned features completed for the current project. A plan-item is a parent item which is assigned subordinate work-items. A plan-item is considered completed only when all of the subordinate work-items have been completed. The positioning of plan-items on the chart is the same as described for work-items. The vertical dashed line above the label "Today" represents the current date. All work-items and plan-items plotted to the left of the "Today" line are work that has completed. All plan-items to the right of the "Today" line are planned to be completed by the date corresponding to their horizontal position. Their vertical position represents the work that will be remaining once each plan-item is completed based on work estimates provided by the user. The horizontal dashed line 1228 on the chart emanates from the most recently completed plan-item and extends to the right to the plan-item stack to indicate completed plan-items. The plan-item stack 1230 to the right of the chart displays all of the plan-items planned for the given project. As plan-items are completed they move to the upper portion of the stack, above the horizontal dashed line. Plan-items in the stack below the horizontal dashed line represent plan-items that are incomplete. "Plan Item 14" shown in the plan-item stack shows a plan-item that is partially complete. The left 20% of the plan-item is marked green indicating that 20% of the subordinate work-items have been completed. Plan-items in the stack shaded blue indicate that other plan-items are blocked by this plan-item. Plan-items shaded gray are blocked by one or more plan-items. Plan-items shaded red are at risk for completing after the planned delivery date based on the current simulation estimates. The gray triangular area 1232 of the Burndown chart shows the current predictions for completion dates. Where the gray area meets the horizontal axis indicates the earliest and latest predicted dates for project completion. As noted above, different visual coding (e.g., different colors or different graphics) may be utilized to present the above-described information on the GUI. The GUI of the present disclosure is not limited to the particular color coding described above, as they were provided as examples only.

Figure 16:
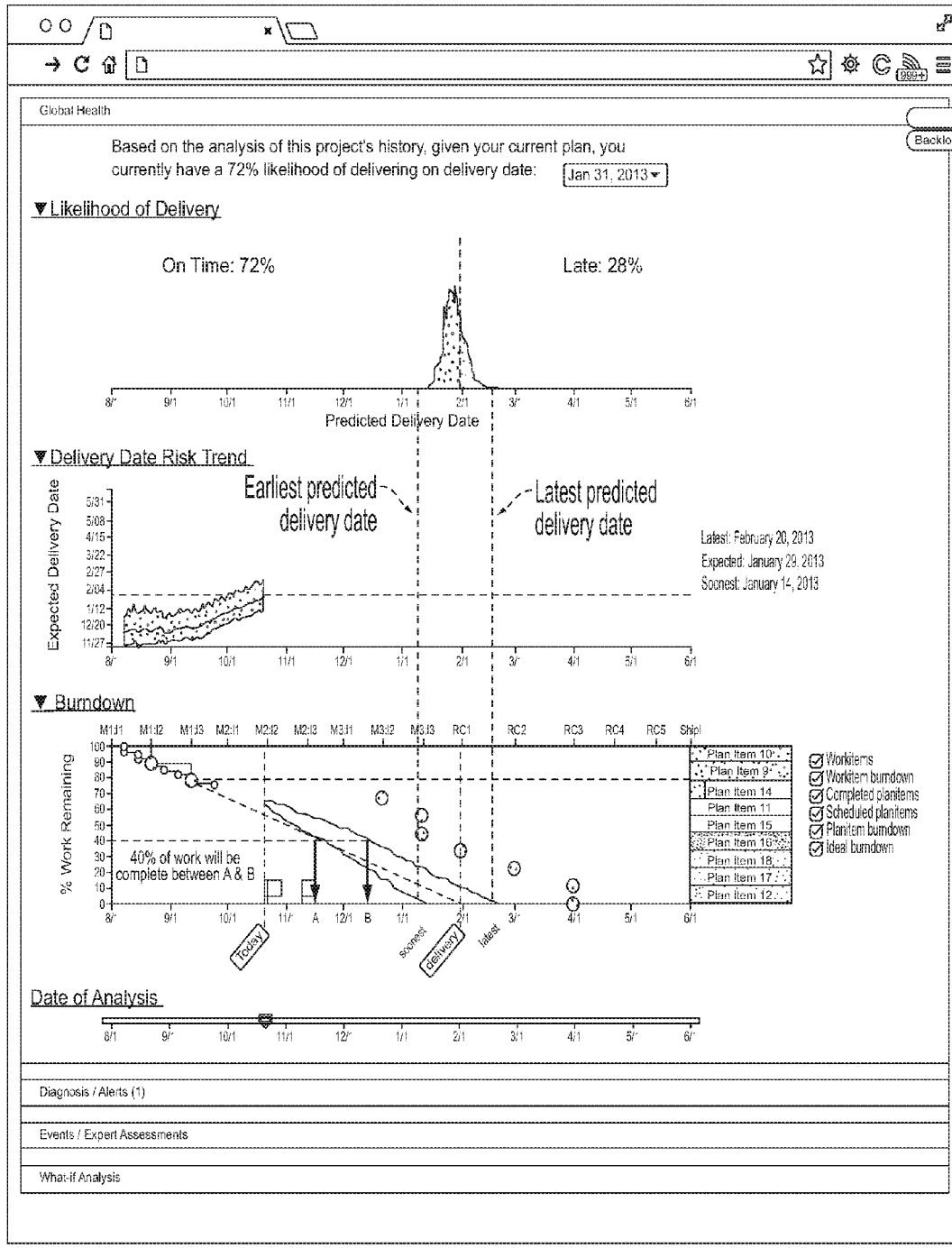
FIG. 16 shows an example of an annotated version of the GUI screenshot shown in FIG. 12 indicating how the horizontal axes of the charts align in one embodiment of the present disclosure.

FIG. 16 shows an example of an annotated version of the GUI screenshot shown in FIG. 12 indicating how the horizontal axes of the charts align. The Earliest predicted delivery date indicated by the gray area of the Burndown chart corresponds to the left tail of the probability distribution of the "Likelihood of Delivery" chart. The Latest predicted delivery date indicated by the gray area of the Burndown chart corresponds to the right tail of the probability distribution of the "Likelihood of Delivery" chart. More detail of the gray area of the Burndown chart shows that the vertical position of the gray triangle indicates the earliest and latest predicted delivery dates for a given percentage of the work to be completed. For example, at the 40% work remaining position, the earliest and latest predicted delivery dates, or dates when there will be 40% of the planned work remaining, are represented by dates A and B.

Figure 17:
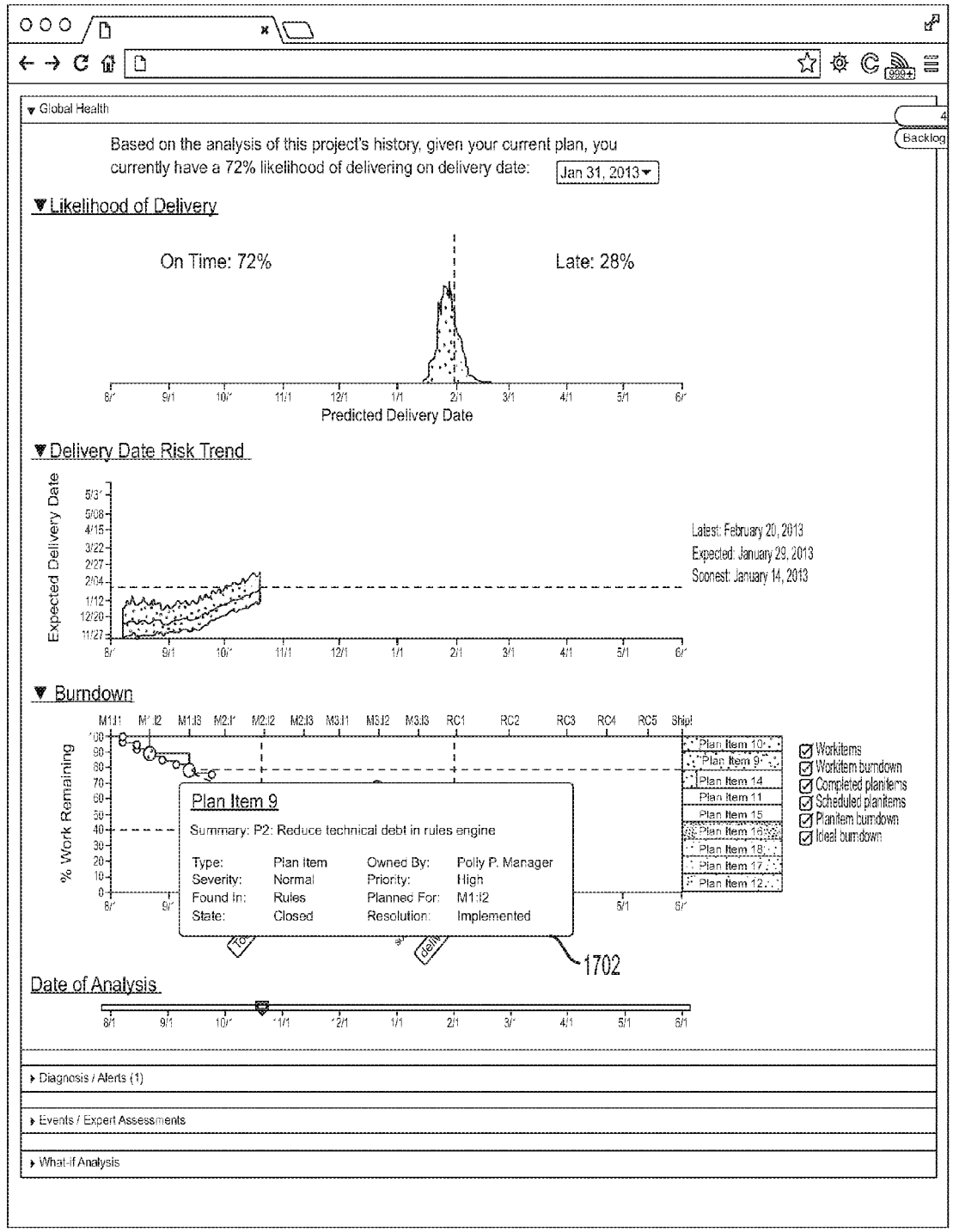
FIG. 17 shows an example of a burndown chart as a pointer is used to mark a plan-item or work-item represented by a circle in the chart in one embodiment of the present disclosure.

FIG. 17 shows an example of the Burndown chart as a pointer is used to mark a plan-item or work-item represented by a circle in the chart. Detailed information 1702 on the selected plan-item or work-item is displayed to the user including the ability to hyperlink to the actual plan-item or work-item in its native environment (e.g., Rational Team Concert).

The current delivery predictions based on all known data are shown in the GUI. The GUI example in FIG. 12 shows a slider labeled "Date of Analysis" 1234 which allows the user to select and show predictions made on a previous date. This allows the user to "play back" a history of delivery date predictions made for the given project using data that was known at the time selected by the "Date of Analysis" slider. Only dates prior to or including today (the current day) and extending back to the start of the project may be selected in one embodiment. All of the charts (e.g., 1200, 1212, 1222) respond accordingly to display the delivery estimates as of the selected "Date of Analysis".

Figure 18:
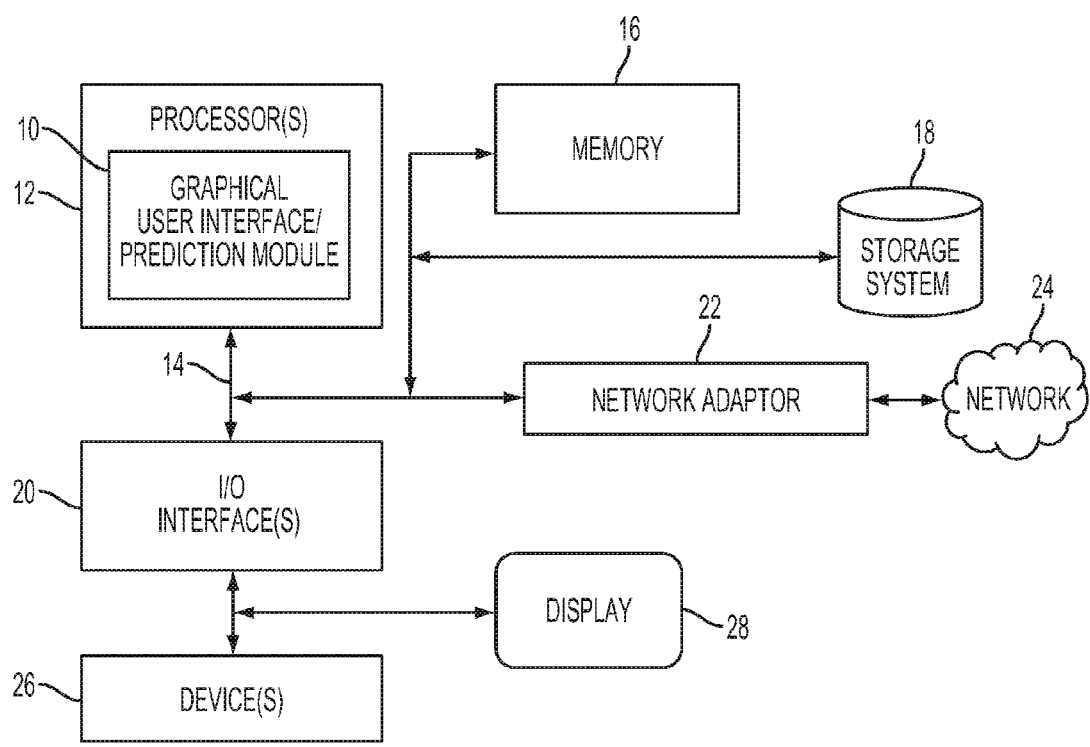
FIG. 18 illustrates a schematic of an example computer or processing system that may implement the completion time prediction system in one embodiment of the present disclosure.

FIG. 18 illustrates a schematic of an example computer or processing system that may implement the project completion time prediction system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 18 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of exploring an impact of changing project parameters on a likely delivery date of a project, comprising:
    allowing a user to specify a change in one or more parameter data associated with the project, the one or more parameter data used previously to compute a probability distribution of completion time of the project;
    recomputing the probability distribution of completion time of the project based on the change, the probability distribution recomputed by a combination of machine learning and stochastic simulation, wherein the machine learning comprises training a machine learning algorithm to predict an estimated effort needed to complete each of unfinished tasks belonging to the project based on a set of completed tasks belonging to the project if available and a set of completed tasks not belonging to the project if available, the stochastic simulation comprising a Monte Carlo simulation based on repeated random sampling of scheduling and assigning of the unfinished tasks to team members subject to resources and scheduling constraints;
    presenting the recomputed probability distribution of the completion time of the project;
    providing an option to the user to save the recomputed probability distribution of the completion time of the project, wherein responsive to detecting that the user chose not to save the recomputed probability distribution of the completion time of the project, recovering the probability distribution of completion time of the project that was computed previously and said one or more parameter data before the change, and responsive to detecting the user chose to save the recomputed probability distribution of the completion time of the project, storing the recomputed probability distribution of completion time of the project and the change in one or more parameter data; and
    providing an option to the user to specify another change in one or more parameter data associated with the project and repeat the recomputing and the presenting based on said another change in one or more parameter data associated with the project.

2. The method of claim 1, wherein the change in one or more parameter data associated with the project comprises one or more of a new delivery date or a scope of commitment in the project.

3. The method of claim 1, wherein the change in one or more parameter data associated with the project comprises a change in team velocity.

4. The method of claim 3, wherein the change in team velocity is provided by one or more of changing of people assigned to the project, changing allocation of work assigned to the people assigned to the project, or changing a scope of the project.

5. The method of claim 1, further comprising committing the recomputed probability distribution of completion time of the project and the changes as an expert assessment, wherein the recomputed probability distribution of completion time of the project and the changes are made visible to one or more other users.

6. The method of claim 1, wherein the allowing comprises providing a graphical user interface that allows the user to specify the changes, wherein the user is allowed to override the one or more parameter data with the change.

7. The method of claim 6, wherein the graphical user interface presents a list of plan items associated with the project, and the graphical user interface allows the user to select or deselect one or more of the plan items to specify a change in a scope of commitment in the project.

8. A system of exploring an impact of changing project parameters on a likely delivery date of a project, comprising:
    a processor;
    a graphical user interface module operable to execute on the processor and further operable to allow a user to specify a change in one or more parameter data associated with the project, the one or more parameter data used previously to compute a probability distribution of completion time of the project;
    a prediction module operable to recompute the probability distribution of completion time of the project based on the change in said one or more parameter data, the probability distribution recomputed by a combination of machine learning and stochastic simulation, wherein the machine learning comprises training a machine learning algorithm to predict an estimated effort needed to complete each of unfinished tasks belonging to the project based on a set of completed tasks belonging to the project if available and a set of completed tasks not belonging to the project if available, the stochastic simulation comprising a Monte Carlo simulation based on repeated random sampling of scheduling and assigning of the unfinished tasks to team members subject to resources and scheduling constraints;

the graphical user interface module further operable to present the recomputed probability distribution of the completion time of the project, the graphical user interface module further operable to provide an option to the user to save the recomputed probability distribution of the completion time of the project, wherein responsive to detecting that the user chose not to save the recomputed probability distribution of the completion time of the project, the probability distribution of completion time of the project that was computed previously and said one or more parameter data before the change are recovered, and responsive to detecting the user chose to save the recomputed probability distribution of the completion time of the project, the recomputed probability distribution of completion time of the project and the change in one or more parameter data are stored, the graphical user interface module further operable to provide an option to the user to specify another change in one or more parameter data associated with the project and repeat recomputing of the probability distribution of completion time of the project based on said another change.

9. The system of claim 8, wherein the change in one or more parameter data associated with the project comprises one or more of a new delivery date or a scope of commitment in the project.

10. The system of claim 8, wherein the change in one or more parameter data associated with the project comprises a change in team velocity.

11. The system of claim 10, wherein the change in team velocity is provided by one or more of changing of people assigned to the project, changing allocation of work assigned to the people assigned to the project, or changing a scope of the project.

12. The system of claim 8, wherein the recomputed probability distribution of completion time of the project and the changes are committed as an expert assessment, wherein the recomputed probability distribution of completion time of the project and the changes are made visible to one or more other users.

13. The system of claim 8, wherein the graphical user interface module presents said one or more parameter data and allows the user to override the one or more parameter data with the change.

14. The system of claim 8, wherein the graphical user interface module presents a list of plan items associated with the project, and allows the user to select or deselect one or more of the plan items to specify a change in a scope of commitment in the project.

15. A non-transitory computer readable storage medium storing a program of instructions executable by a machine to perform a method of exploring impact of changing project parameters on likely delivery date of a project, the method comprising:

allowing a user to specify a change in one or more parameter data associated with the project, the one or more parameter data used previously to compute a probability distribution of completion time of the project;

recomputing the probability distribution of completion time of the project based on the change, the probability distribution recomputed by a combination of machine learning and stochastic simulation, wherein the machine learning comprises training a machine learning algorithm to predict an estimated effort needed to complete each of unfinished tasks belonging to the project based on a set of completed tasks belonging to the project if available and a set of completed tasks not belonging to the project if available, the stochastic simulation comprising a Monte Carlo simulation based on repeated random sampling of scheduling and assigning of the unfinished tasks to team members subject to resources and scheduling constraints;

presenting the recomputed probability distribution of the completion time of the project;

providing an option to the user to save the recomputed probability distribution of the completion time of the project, wherein responsive to detecting that the user chose not to save the recomputed probability distribution of the completion time of the project, recovering the probability distribution of completion time of the project that was computed previously and said one or more parameter data before the change, and responsive to detecting the user chose to save the recomputed probability distribution of the completion time of the project, storing the recomputed probability distribution of completion time of the project and the change in one or more parameter data; and providing an option to the user to specify another change in one or more parameter data associated with the project and repeat the recomputing and the presenting based on said another change in one or more parameter data associated with the project.

16. The non-transitory computer readable storage medium of claim 15, wherein the change in one or more parameter data associated with the project comprises one or more of a new delivery date or a scope of commitment in the project.

17. The non-transitory computer readable storage medium of claim 15, wherein the change in one or more parameter data associated with the project comprises a change in team velocity.

18. The non-transitory computer readable storage medium of claim 17, wherein the change in team velocity is provided by one or more of changing of people assigned to the project, changing allocation of work assigned to the people assigned to the project, or changing a scope of the project.

19. The non-transitory computer readable storage medium of claim 15, further comprising committing the recomputed probability distribution of completion time of the project and the changes as an expert assessment, wherein the recomputed probability distribution of completion time of the project and the changes are made visible to one or more other users.

20. The non-transitory computer readable storage medium of claim 15, wherein the allowing comprises providing a graphical user interface that allows the user to specify the changes, wherein the user is allowed to override the one or more parameter data with the change, and wherein the graphical user interface presents a list of plan items associated with the project, and the graphical user interface allows the user to select or deselect one or more of the plan items to specify a change in a scope of commitment in the project.

* * * * *